(12) United States Patent
Lee et al.

(10) Patent No.: US 11,960,582 B2
(45) Date of Patent: Apr. 16, 2024

(54) METHOD AND ELECTRONIC DEVICE FOR AUTHENTICATING USER BY USING VOICE COMMAND

(71) Applicant: Samsung Electronics Co., Ltd., Suwon-si (KR)

(72) Inventors: Boram Lee, Suwon-si (KR); Woohyoung Lee, Suwon-si (KR); Taeksoo Chun, Suwon-si (KR); Sunah Kim, Suwon-si (KR); Yongho Kim, Suwon-si (KR); Kyoungsun Cho, Suwon-si (KR); Gahyun Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 943 days.

(21) Appl. No.: 15/733,390

(22) PCT Filed: Dec. 10, 2018

(86) PCT No.: PCT/KR2018/015591
§ 371 (c)(1),
(2) Date: Jul. 17, 2020

(87) PCT Pub. No.: WO2019/143022
PCT Pub. Date: Jul. 25, 2019

(65) Prior Publication Data
US 2021/0097158 A1  Apr. 1, 2021

(30) Foreign Application Priority Data
Jan. 17, 2018 (KR) .................. 10-2018-0006056

(51) Int. Cl.
*G06F 21/32* (2013.01)
*G06F 21/45* (2013.01)
(Continued)

(52) U.S. Cl.
CPC .............. *G06F 21/32* (2013.01); *G06F 21/45* (2013.01); *G06V 40/50* (2022.01); *G10L 15/04* (2013.01);
(Continued)

(58) Field of Classification Search
CPC ........ G06F 21/32; G06F 21/31; G06F 3/0481; G06F 16/58; G06F 16/532; G06F 15/16;
(Continued)

(56) References Cited

U.S. PATENT DOCUMENTS 7,506,162 B1 * 3/2009 Hsu ...................... H04L 63/0815
713/168
7,836,510 B1 * 11/2010 Angal .................. G06F 21/6218
726/8

(Continued)

FOREIGN PATENT DOCUMENTS

JP  2007052496 A   3/2007
JP  3934946 B2   6/2007
(Continued)

OTHER PUBLICATIONS

Notice of Patent Grant dated Nov. 3, 2022 in connection with Korean Patent Application No. 10-2018-0006056, 5 pages.
(Continued)

*Primary Examiner* — Sharif E Ullah

(57) ABSTRACT

Various embodiments of the present invention relate to a method and an electronic device for authenticating a user by using a voice command. Here, the electronic device may comprise a memory, an input apparatus, and a processor, wherein the processor is configured to: receive a voice command from the input apparatus; acquire user identification information and voice print information from the voice command; search reference voice print information of each of multiple users stored in the memory, for reference voice
(Continued)

print information corresponding to the acquired user identification information; and perform authentication on the basis of the acquired voice print information and the reference voice print information. Other embodiments are also possible.

15 Claims, 20 Drawing Sheets

(51) Int. Cl.
    *G06V 40/50*     (2022.01)
    *G10L 15/04*     (2013.01)
    *G10L 15/22*     (2006.01)
    *G10L 17/24*     (2013.01)

(52) U.S. Cl.
    CPC .............. *G10L 15/22* (2013.01); *G10L 17/24* (2013.01); *G10L 2015/223* (2013.01); *G10L 2015/227* (2013.01)

(58) Field of Classification Search
    CPC ............. G06F 3/048; G06F 2221/2111; H04L 63/0861; H04L 9/3231; H04L 67/306; H04L 67/535; H04L 51/52; H04L 67/02; H04L 65/403; H04L 67/10; H04L 51/10; H04W 12/06; H04W 4/80; H04W 4/50; H04W 12/08; H04W 4/021; H04W 4/33; H04W 4/029; H04W 12/065; H04W 4/38; H04W 12/068
    USPC ......... 713/186, 150, 163, 181; 726/2, 21, 36
    See application file for complete search history.

(56) References Cited

U.S. PATENT DOCUMENTS

| | | | | |
|---|---|---|---|---|
| 8,869,244 | B1* | 10/2014 | Sundaram | G06F 21/604 726/4 |
| 11,625,467 | B2* | 4/2023 | Keret | G06F 21/32 713/186 |
| 2004/0177097 | A1* | 9/2004 | Yu | G06Q 90/00 |
| 2006/0218630 | A1* | 9/2006 | Pearson | G06F 21/41 726/8 |
| 2007/0183633 | A1* | 8/2007 | Hoffmann | G06V 40/16 382/116 |
| 2007/0192326 | A1* | 8/2007 | Angal | G06F 11/203 |
| 2008/0086759 | A1* | 4/2008 | Colson | H04L 63/1416 713/182 |
| 2008/0178262 | A1* | 7/2008 | Taniguchi | G06V 40/50 726/2 |
| 2010/0115114 | A1* | 5/2010 | Headley | H04L 51/52 709/229 |
| 2010/0246902 | A1* | 9/2010 | Rowe | G07D 7/121 382/115 |
| 2011/0001607 | A1* | 1/2011 | Kamakura | G06V 40/1365 340/5.82 |
| 2011/0153727 | A1* | 6/2011 | Li | H04L 67/10 709/203 |
| 2011/0251954 | A1* | 10/2011 | Chin | G06Q 20/102 705/40 |
| 2011/0277016 | A1* | 11/2011 | Hockings | G06F 21/41 726/8 |
| 2012/0005736 | A1* | 1/2012 | Takahashi | G06Q 20/40145 726/7 |
| 2012/0253809 | A1* | 10/2012 | Thomas | G10L 17/24 704/E15.001 |
| 2012/0290592 | A1* | 11/2012 | Ishii | G06F 16/256 707/754 |
| 2013/0066770 | A1* | 3/2013 | Das | G06Q 20/145 715/740 |
| 2013/0066945 | A1* | 3/2013 | Das | G06F 8/60 709/203 |
| 2013/0067345 | A1* | 3/2013 | Das | H04L 41/122 715/740 |
| 2013/0067469 | A1* | 3/2013 | Das | G06F 9/5077 718/1 |
| 2013/0073670 | A1* | 3/2013 | Das | H04L 67/30 709/217 |
| 2013/0073703 | A1* | 3/2013 | Das | H04L 67/14 709/223 |
| 2013/0074064 | A1* | 3/2013 | Das | G06F 9/5077 718/1 |
| 2013/0074179 | A1* | 3/2013 | Das | G06F 9/452 726/18 |
| 2013/0110922 | A1* | 5/2013 | Shih | G06Q 50/01 709/204 |
| 2013/0138964 | A1* | 5/2013 | Joyce, III | H04L 9/3231 713/176 |
| 2013/0195285 | A1* | 8/2013 | De La Fuente | G07C 9/37 704/E15.001 |
| 2013/0276085 | A1* | 10/2013 | Sharaga | H04L 67/303 726/8 |
| 2015/0025888 | A1* | 1/2015 | Sharp | G10L 17/00 704/246 |
| 2016/0035350 | A1* | 2/2016 | Jung | G06F 3/167 704/275 |
| 2016/0232893 | A1* | 8/2016 | Subhojit | G10L 15/063 |
| 2017/0092278 | A1* | 3/2017 | Evermann | G10L 17/24 |
| 2017/0221488 | A1* | 8/2017 | Xiong | G10L 17/02 |

FOREIGN PATENT DOCUMENTS

| | | |
|---|---|---|
| KR | 20140139982 A | 12/2014 |
| KR | 10-2016-0014297 A | 2/2016 |
| KR | 10-2016-0098771 A | 8/2016 |
| KR | 10-2017-0069258 A | 6/2017 |

OTHER PUBLICATIONS

International Search Report and Written Opinion of the International Searching Authority in connection with International Application No. PCT/KR2018/015591 dated Feb. 28, 2019, 12 pages.
Korean Intellectual Property Office, "Office Action," dated May 13, 2022, in connection with Korean Patent Application No. 10-2018-0006056, 18 pages.

\* cited by examiner

METHOD AND ELECTRONIC DEVICE FOR AUTHENTICATING USER BY USING VOICE COMMAND

CROSS-REFERENCE TO RELATED APPLICATIONS

This application is a 371 National Stage of International Application No. PCT/KR2018/015591, filed Dec. 10, 2018, which claims priority to Korean Patent Application No. 10-2018-0006056, filed Jan. 17, 2018, the disclosures of which are herein incorporated by reference in their entirety.

BACKGROUND

1. Field

Various embodiments of the disclosure relate to an apparatus and a method for performing user authentication by using a voice command in an electronic device.

2. Description of Related Art

With the development of digital technology, various types of electronic devices such as televisions (TVs), mobile communication terminals, personal digital assistants (PDAs), electronic schedulers, smartphones, tablet personal computers (PCs), wearable devices, or the like are widely used.

An electronic device may provide an artificial intelligence (AI) service on the basis of speech recognition technology. For example, the electronic device may recognize a voice command spoken by a user on the basis of speech recognition technology, and may perform a function corresponding to the recognized voice command.

SUMMARY

An electronic device may perform user authentication by using a voice password in order to provide an AI service requiring security. For example, the electronic device may acquire a voice password from a user speech, and may perform user authentication by comparing the voice password and a pre-registered password. However, in the method of authenticating using a voice password, a voice password may be easily exposed to other users and there is inconvenience that a user should remember a voice password.

Accordingly, various embodiments of the disclosure provide an apparatus and a method for performing user authentication by using an interactive voice command in an electronic device.

According to various embodiments, an electronic device may include a memory, an input device, and a processor, and the processor may be configured to: receive a voice command from the input device; acquire user identification information and voice print information from the voice command; search reference voice print information corresponding to the acquired user identification information from among respective pieces of reference voice print information regarding a plurality of users which are stored in the memory; and perform authentication on the basis of the acquired voice print information and the reference voice print information.

According to various embodiments, an operating method of an electronic device may include: receiving a voice command through an input device; acquiring user identification information and voice print information from the voice command; searching reference voice print information corresponding to the acquired user identification information from among respective pieces of reference voice print information regarding a plurality of users; and performing authentication on the basis of the acquired voice print information and the reference voice print information.

The electronic device and the operating method thereof according to various embodiments may obtain an identification word and voice print information from a voice command, and may perform user authentication by comparing the acquired voice print information and reference voice print information corresponding to the identification word, such that security and authentication speed can be enhanced.

The electronic device and the operating method thereof according to various embodiments may request an additional speech on the basis of a matching ratio between voice print information of a voice command and already-registered reference voice print information, and may perform user authentication on the basis of the additional speech, such that authentication accuracy can be enhanced.

The electronic device and the operating method thereof according to various embodiments may compare voice print information of a corresponding voice command and voice print information at least one other user when user authentication as to a voice command including an identification word of a first user fails, such that accuracy of result of authentication can be enhanced and a user speaking the corresponding voice command can be identified.

DETAILED DESCRIPTION

Figure 1:
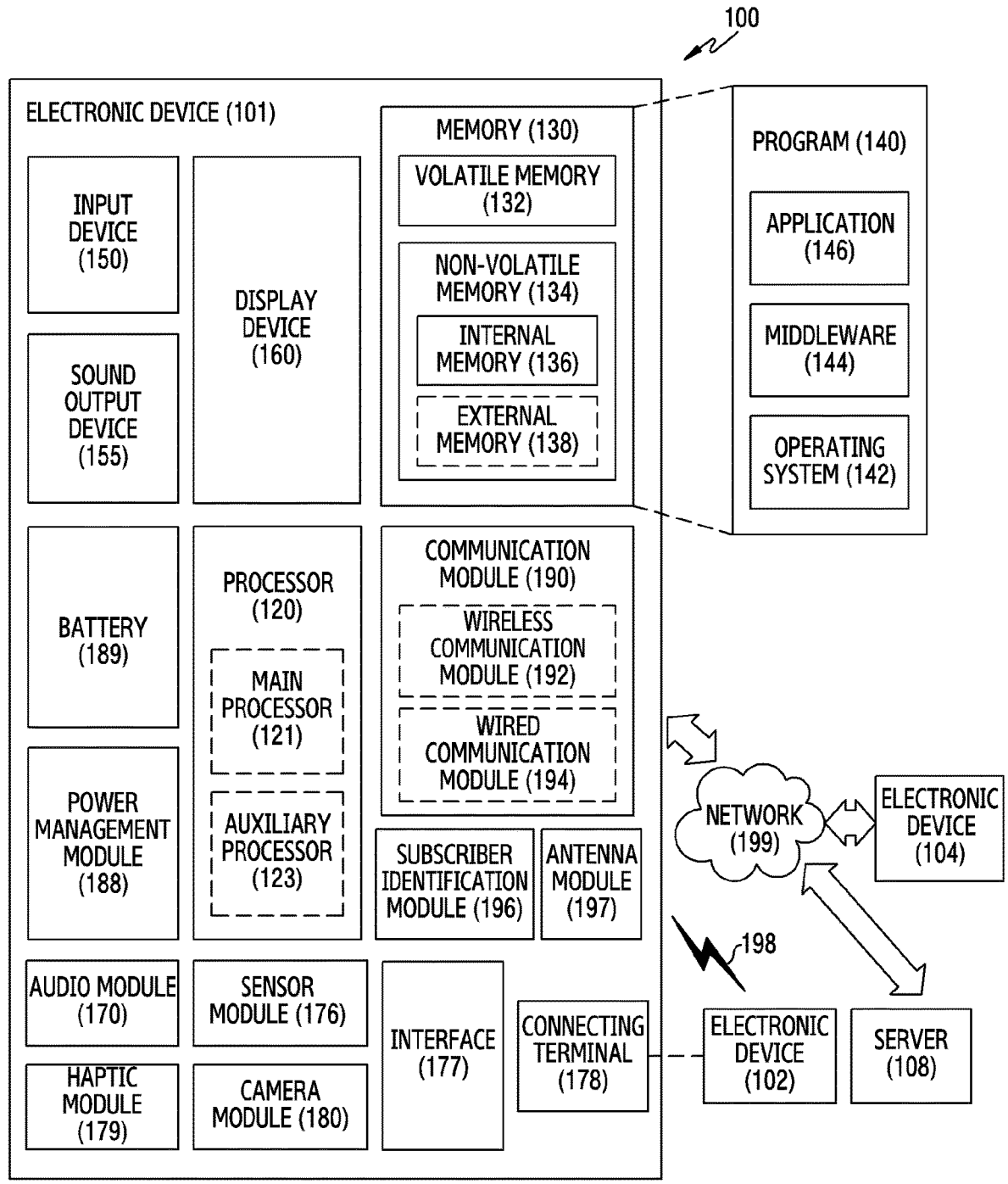
FIG. 1 is a block diagram of an electronic device 101 in a network environment 100 according to various embodiments of the disclosure.

Hereinafter, various embodiments of the disclosure will be described with reference to the accompanying drawings. It should be appreciated that embodiments and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may include one or more antennas for transmitting a signal or power to the outside or receiving it from the outside. According to an embodiment, the communication module 190 (e.g., the wireless communication module 192) may transmit a signal to an external electronic device through an antenna suitable for a communication method, or receive a signal from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the processor 120 may register user authentication information on the basis of a voice command received through the input device 150. For example, the processor 120 may detect an event for registering user authentication information, and may receive a voice command through the input device 150. According to an embodiment, the voice command may include a voice command which induces the electronic device 101 to perform at least one function. For example, the voice command may include a voice signal including an explicit command, or a voice signal (for example, a voice signal including a greeting expression such as "Hi, Bixby") inducing a response (for example, a voice signal output as to a voice command) of the electronic device 101. The event for registering the user authentication information may occur on the basis of detection of an unregistered identification word, detection of an unregistered user, or detection of a voice command to request registration, a user input through an input device (for example, a mouse or a keyboard), a request from an external electronic device through the interface 177, or a user input through a touch circuit and/or a pressure sensor of the display device 160. The identification word may be identification information for identifying a user, and for example, may be a user name or a nickname. However, this is merely an example and the present disclosure is not limited thereto. For example, the identification word may be configured with a number, a character designated by the user, or a combination thereof. In another example, the identification word may be at least a part of a text corresponding to the voice command. For example, if a text corresponding to the voice command is "I'm Tim," the entirety of "I'm Tim" may be used as an identification word, and "Tim" corresponding to the user name may be used as an identification word. Although a user name is used as an identification word in various embodiments of the present disclosure for convenience of explanation, the entirety or at least a part of a voice command may be used as an identification word as described above. According to an embodiment, the processor 120 may acquire an identification word and/or voice print information by analyzing the received voice command, and may set the acquired voice print information as reference voice print information regarding the acquired identification word. The voice print information may be information visualizing a resonance frequency of a user voice, and may include information of anatomical characteristics (for example, a pitch of a voice frequency, a slope of a voice spectrum), and/or a behavior pattern of the user (for example, a voice pitch, a speaking style). According to an embodiment, the processor 120 may determine whether there exists an identification word in the received voice command, and, when there does not exist an identification word, may output a message and/or a signal requesting the user to speak a voice command including an identification word. For example, the processor 120 may control the display device 160 to display the message requesting the user to speak a voice command including an identification word, or may control the sound output device 155 to output the voice signal (or a voice message) requesting the user to speak a voice command including an identification word. For example, when a voice command to request registration does not include an identification word, like "Register me!" or "I will register", the processor 120 may output a voice signal such as "Who are you?" or "Tell me your name" to request the user to speak a voice command including an identification word. According to various embodiments, the processor 120 may repeatedly acquire a voice command including an identification word from the user multiple times, and may set an identification word and reference voice print information by analyzing the voice commands repeatedly acquired multiple times. The voice commands repeatedly acquired multiple times may be the same voice command formed of the same text, or at least some of the voice commands may be different. For example, the processor 120 may acquire the same voice command "I'm Ben" multiple times, and may acquire the identification word "Ben" and reference voice print information regarding "Ben." In another example, the processor 120 may acquire a first voice command "I'm Ben," a second voice command "My name is Ben," a third voice command "Ben," and may acquire the identification word "Ben" and reference voice print information regarding "Ben." According to an embodiment, the reference voice print information may be acquired from at least a part of the voice command. For example, when the voice command is "I'm Ben," the reference voice print information may be acquired from the entirety of the voice command "I'm Ben", or may be acquired from "Ben" corresponding to the identification word.

According to various embodiments, the processor 120 may store the identification word and the reference voice print information acquired in the memory 130 as authentication information of the user. For example, the processor 120 may store the identification word and the reference voice print information acquired in association with specific user information (for example, user account information), thereby registering the identification word and the reference voice print information acquired as authentication information of a specific user. According to an embodiment, the processor 120 may display at least one piece of user information on the display device 160, and may request the user to select the displayed user information or to input new user information in order to register user authentication information. The processor 120 may acquire user information on the basis of a user input through the input device 150 and/or the display device 160, and may store the identification word and the reference voice print information acquired from the voice command in association with the acquired user information. According to an embodiment, the processor 120 may store a text corresponding to the acquired voice command in association with the authentication information of the user and/or the identification word. For example, the processor 120 may designate a text indicating the voice command "I'm Ben" including the identification word "Ben" as a text for user authentication, and may store the designated text along with the authentication information of the user. The text for user authentication may be used when the user is requested to make an additional speech and/or a speech including an identification word.

According to various embodiments, the processor 120 may acquire an identification word and voice print information from a voice command inputted through the input device 150, and may acquire reference voice print information corresponding to the acquired identification word from the memory 130. According to an embodiment, the processor 120 may determine whether the inputted voice command is a voice command requiring user authentication. For example, when the inputted voice command is a voice command to request execution of a new service (or application), a voice command including a pre-designated text, a voice command related to a service (or an application) requiring security, a voice command requiring connection to an account of a specific user, or a voice command including an identification word, the processor 120 may determine that the inputted voice command is the voice command requiring user authentication. The voice command to request execution of a new service may include, for example, a voice command such as "Show me my gallery," "Play my playlist," "Read my message," "Check missed calls." The voice command related to a service requiring security may include, for example, a voice command related to financial services (for example, transmittance, payment, etc.) or a voice command related to personal information setting. According to an embodiment, when the inputted voice command is a voice command that does not require user authentication, the processor 120 may control to perform an operation corresponding to the voice command. According to an embodiment, when the inputted voice command is a voice command that requires user authentication, the processor 120 may determine whether the inputted voice command includes an identification word for user authentication. When the inputted voice command includes the identification word, the processor 120 may acquire the identification word and voice print information from the corresponding voice command. When the inputted voice command does not include the identification word, the processor 120 may output a message and/or a signal requesting the user to additionally speak a voice command including an identification word. For example, the processor 120 may output the message and/or the signal requesting the user to additionally speak a voice command including an identification word, such as "Who are you?", "Please tell me who you are," "What is your name?", "Please tell me your name." The processor 120 may acquire an identification word and voice print information from the voice command inputted by the additional speech of the user. According to an embodiment, the processor 120 may determine whether the acquired identification word is a pre-registered identification word. For example, the processor 120 may determine whether the identification word acquired from the voice command is identical to any one of identification words registered at the memory 130 as user authentication information. According to an embodiment, when there does not exist an identification word identical to the acquired identification word from among the identification words registered at the memory 130, the processor 120 may determine that the identification word is an unregistered user and/or an unregistered identification word, and may output a message and/or a signal requesting registration of a user and/or an identification word. The processor 120 may receive an input of requesting registration of the user and/or the identification word in response to the message and/or the signal requesting registration of the user and/or the identification word being outputted, and may register user authentication information on the basis of a voice command received through the input device 150 as described above. According to an embodiment, when a certain identification word from among the identification words registered at the memory 130 is identical to the acquired identification word, the processor 120 may determine that the identification word acquired from the voice command is an identification word already registered at the memory 130, and may search reference voice print information from the memory 130 on the basis of the acquired identification word. For example, the processor 120 may acquire reference voice print information registered as authentication information regarding the acquired identification word from among the pieces of reference voice print information stored in the memory 130.

According to various embodiments, the processor 120 may determine whether to request an additional speech of the user by comparing a length of the inputted voice command and a length of the text for user authentication. For example, when the length of the inputted voice command is shorter than the length of the text for user authentication, the processor 120 may request an additional speech of the user. According to an embodiment, when requesting an additional speech of the user, the processor 120 may output a message and/or a signal requesting the user to speak a text stored in association with authentication information of the corresponding identification word. For example, when the inputted voice command is "Ben" and the text for user authentication is "I'm Ben," the processor 120 may determine that the length of the inputted voice command is shorter than the length of the text for user authentication, and may request the user to speak a designated text, such as "I'm Ben." The processor 120 may receive a voice command which is longer than or equal to the length of the text for user authentication by the additional speech of the user. The processor 120 may acquire the identification word and the voice print information from the voice command inputted as described above, and may acquire the reference voice print information corresponding to the acquired identification word.

According to various embodiments, the processor 120 may perform user authentication by comparing the voice print information acquired from the inputted voice command and the reference voice print information acquired from the memory 130. According to an embodiment, the processor 120 may determine a matching ratio (or similarity) by comparing the voice print information acquired from the inputted voice command and the reference voice print information, and may determine whether user authentication succeeds on the basis of the matching ratio. According to an embodiment, the processor 120 may determine whether user authentication succeeds on the basis of whether the matching ratio corresponds to a pre-set reference range. For example, when the matching ratio corresponds to a first reference range, the processor 120 may determine that user authentication succeeds, and may control to perform a function corresponding to the voice command. In another example, when the matching ratio does not correspond to the first reference range and corresponds to a second reference range, the processor 120 may defer determining whether user authentication succeeds, and may output a message and/or a signal requesting an additional speech. The message and/or the signal requesting the additional speech may be a message and/or a signal requesting the user to speak a voice command including an identification word. In still another example, when the matching ratio does not correspond to the first reference range and the second reference range, the processor 120 may determine that user authentication fails, and may output a message and/or a signal indicating that user authentication fails. For example, when the matching ratio corresponds to a third reference range, the processor 120 may determine that user authentication files, and may output the message and/or the signal indicating that user authentication fails.

According to various embodiments, when it is determined that user authentication as to the user command fails, the processor 120 may identify the user speaking the corresponding voice command on the basis of voice print information of another user. For example, when the matching ratio between the voice print information acquired from the voice command and the reference voice print information corresponding to the identification word included in the voice command does not correspond to the first reference range and the second reference range, the processor 120 may determine whether there exists voice print information of another user regarding an identification word included in the voice command. The voice print information of another user may be acquired when the user succeeding in user authentication speaks an identification word of another user other than the user's own identification word. For example, in a state where authentication of a user "Jina" succeeds on the basis of a first voice command "I'm Jina," when a second voice command "Show me the photo taken with Ben" is received, the processor 120 may store voice print information of the second voice command as voice print information of another user regarding the identification word "Ben." The voice print information of another user may be stored in association with information of the user speaking the corresponding identification word. When there exists voice print information of another user regarding the corresponding identification word, the processor 120 may compare the voice print information acquired from the inputted voice command and the voice print information of another user. The processor 120 may identify the user speaking the corresponding identification word, on the basis of a result of comparing the voice print information acquired from the inputted voice command and the voice print information of another user. For example, when a matching ratio between the voice print information acquired from the inputted voice command and the voice print information of anther user regarding the corresponding identification word corresponds to a designated fourth reference range, the processor 120 may identify another user speaking the inputted voice command, on the basis of user information stored in association with the voice print information of another user. The fourth reference range may be set to the same value as the first reference range or may be set to a different value. For example, the processor 120 may identify that a user speaking a voice command including an identification word "I'm Ben" is not "Ben" but "Jina." When the matching ratio between the voice print information acquired from the inputted voice command and the voice print information of another user regarding the corresponding identification word does not correspond to the designated fourth reference range, or there does not exist voice print information of another user regarding the corresponding identification word, the processor 120 may output a message and/or a signal requesting the user to speak an identification word that can identify the user, along with the message and/or the signal indicating that user authentication fails. For example, a message and/or a voice signal such as "You may not be Ben. Who are you?".

According to various embodiments, the processor 120 may refine a voice print information database (DB) stored in the memory 130, on the basis of at least one of a voice command to request execution of a new service, a voice command inputted by an additional speech request, a voice command including a pre-designated text, or a voice command including an identification word. According to an embodiment, when user authentication as to a first voice command succeeds, the processor 120 may refine the reference voice print information on the basis of voice print information of the first voice command. The reference voice print information may be refined by a deep learning technique, for example. According to an embodiment, when user authentication as to the first voice command succeeds, the processor 120 may additionally register the voice print information of the first voice command as reference voice print information corresponding to a corresponding identification word. For example, the processor 120 may register and/or store a plurality of pieces of reference voice print information with respect to one identification word.

Figure 2:
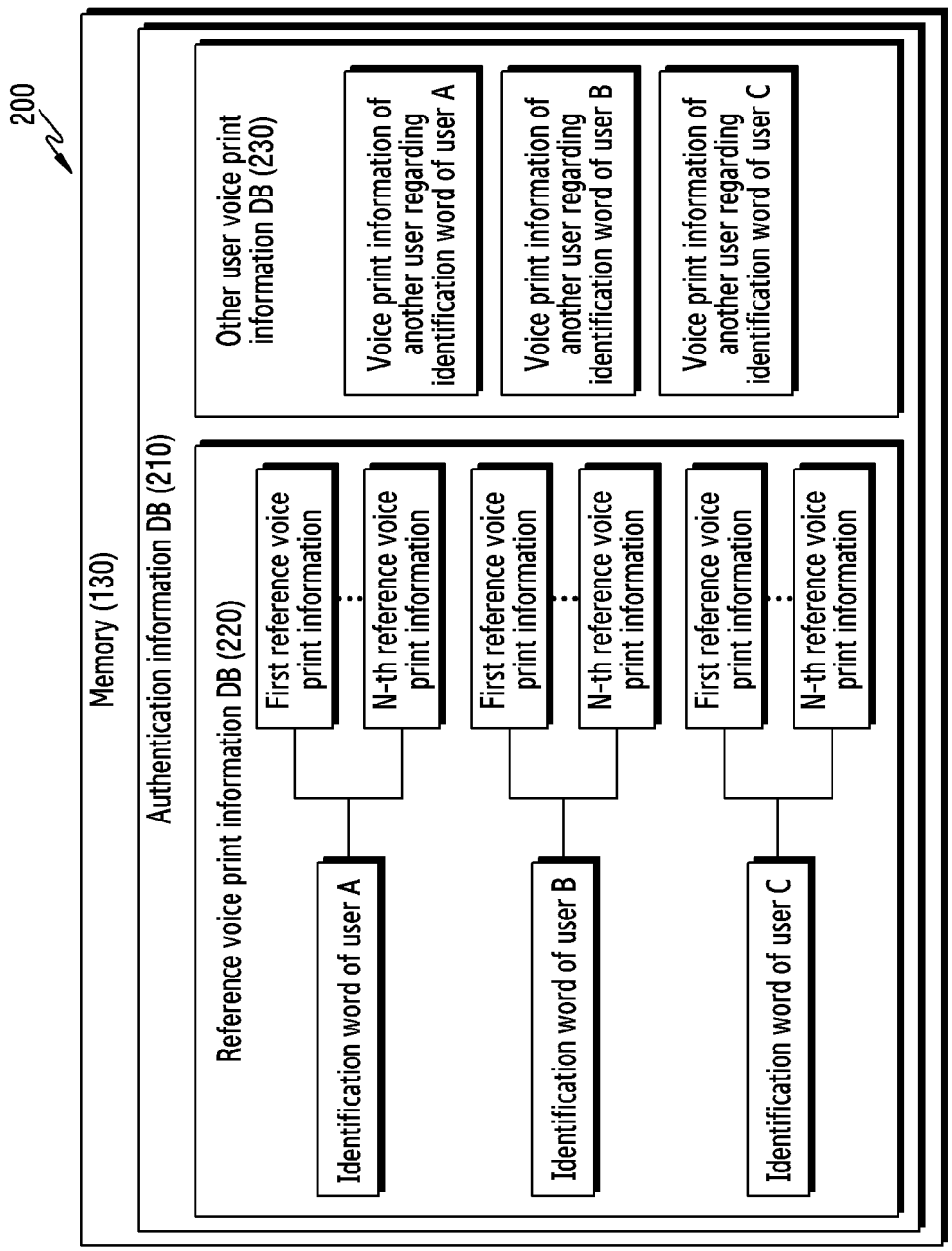
FIG. 2 is a block diagram 200 of a memory 130 according to various embodiments of the disclosure.

FIG. 2 illustrates a block diagram 200 of a memory 130 according to various embodiments of the disclosure. In the following description, the memory 130 may be the memory 130 of FIG. 1 or may include some components of the memory 130 of FIG. 1. Hereinafter, a detailed description of the same components as in FIG. 1 will be omitted.

According to various embodiments, the memory 130 may include an authentication information DB 210. The authentication information DB 210 may store authentication information regarding a plurality of users registered at the electronic device 101. According to an embodiment, the authentication information DB 210 may include a reference voice print information DB 220 and an other user voice print information DB 230.

According to various embodiments, the authentication information DB 210 may include identification words regarding a plurality of users and at least one piece of reference voice print information corresponding to each identification word. For example, the reference voice print information DB 220 may include an identification word of a user A and at least one piece of reference voice print information corresponding to the identification word of the user A, and may store an identification word of a user B and at least one piece of reference voice print information corresponding to the identification word of the user B, and/or an identification word of a user C and at least one piece of reference voice print information corresponding to the identification word of the user C. According to an embodiment, the at least one piece of reference voice print information may include reference voice print information which is acquired when user authentication information is registered. According to an embodiment, the at least one piece of reference voice print information may include voice print information of a voice command which is used in a user authentication procedure as additional reference voice print information. For example, when user authentication succeeds, the processor 120 may store, in the reference voice print information DB 220 of the memory 120, voice print information of a voice command initially inputted for corresponding user authentication, and/or voice print information of a voice command acquired by an additional speech for corresponding user authentication, as additional reference voice print information. According to an embodiment, the processor 120 may refine the reference voice print information by using additional reference voice print information on the basis of a deep learning technique.

According to various embodiments, the other user voice print information DB 230 may include voice print information of other users regarding each of the pre-registered identification words. For example, the other user voice print information DB 230 may include voice print information of other users regarding the identification word of the user A, voice print information of other users regarding the identification word of the user B, and/or voice print information of other users regarding the identification word of the user C.

According to various embodiments, an electronic device may include a memory, an input device, and a processor, and the processor may be configured to: receive a voice command from the input device; acquire user identification information and voice print information from the voice command; search reference voice print information corresponding to the acquired user identification information from among respective pieces of reference voice print information regarding a plurality of users which are stored in the memory; and perform authentication on the basis of the acquired voice print information and the reference voice print information.

According to various embodiments, the electronic device may further include at least one of a display device and a sound output device, and the processor is configured to: determine a matching ratio by comparing the acquired voice print information and the reference voice print information; when the matching ratio correspond to a first designated range, determine that authentication succeeds, and refine the reference voice print information on the basis of the voice print information acquired from the voice command.

According to various embodiments, when the matching ratio corresponds to a second designated range, the electronic device may be configured to output an additional speech request message through at least one of the display device and the sound output device.

According to various embodiments, the additional speech request message may include guide information regarding an additional speech.

According to various embodiments, the processor may be configured to: when the matching ratio corresponds to a third designated ratio, search voice print information of another user regarding the acquired user identification information; and identify a user speaking the voice command on the basis of the acquired voice print information and the voice print information of another user.

According to various embodiments, when the matching ratio corresponds to the third designated range, the processor may be configured to output a message including at least one of a user authentication failure and information indicating the identified user.

According to various embodiments, when a length of the received voice command is shorter than a designated length, the processor may be configured to output an additional speech request message through at least one of the display device and the sound output device, and the additional speech request message may include guide information regarding an additional speech.

According to various embodiments, the electronic device may further include at least one of a display device and a sound output device, and the processor may be configured to: determine whether there exists the user identification information in the received voice command; when there does not exist the user identification information in the received voice command, output an additional speech request message regarding a voice command including the user identification information through at least one of the display device and the sound output device; and, in response to the additional speech request message regarding the voice command, receive a voice command including the user identification information through the input device.

According to various embodiments, the processor may be configured to determine whether the voice command received from the input device requires authentication, on the basis of whether the inputted voice command corresponds to at least one of a voice command requesting execution of a new service, a voice command including a pre-designated text, a voice command related to a service requiring security, a voice command requiring connection with an account of a specific user, or a voice command including an identification word.

According to various embodiments, the processor may be configured to: detect a user authentication information registration event; acquire user account information; acquire user identification information and reference voice print information from a voice command for the user authentication information registration; and store the user identification information and the reference voice print information acquired from the voice command for the user authentication information registration in the memory as authentication information regarding the user account information.

According to various embodiments, the processor may be configured to detect the user authentication information registration event on the basis of at least one of detection of an unregistered identification word, detection of an unregistered user, detection of a voice command to request registration, a request from an external electronic device, a user input through the input device, and a user input through a display device.

Figure 3:
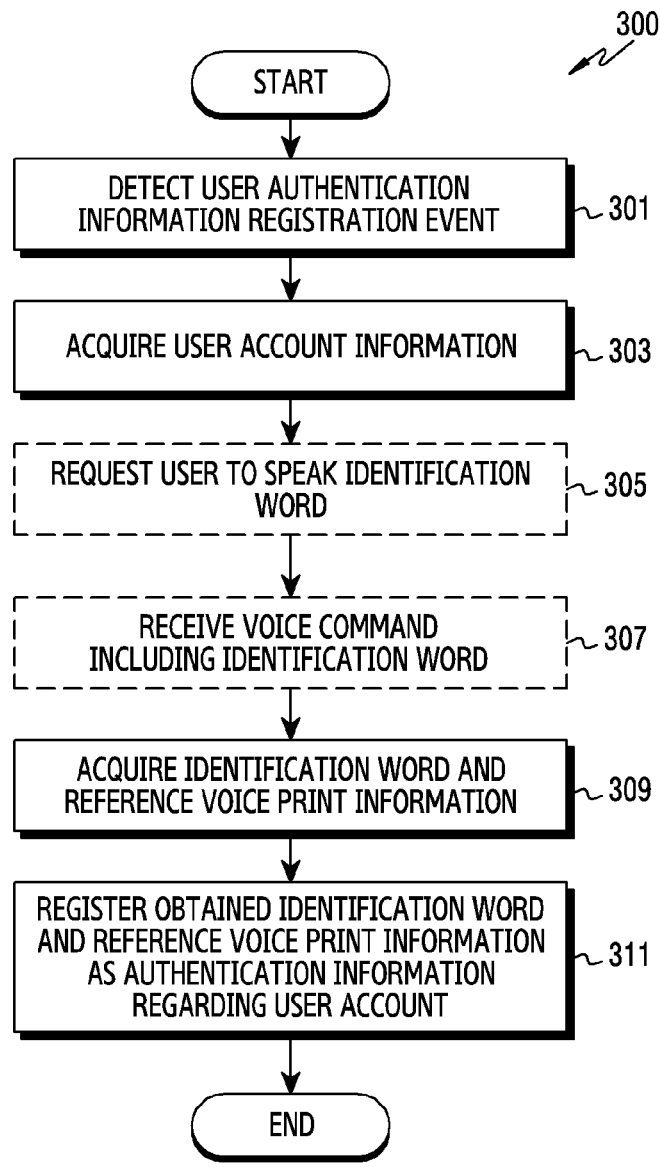
FIG. 3 is a flowchart for registering user authentication information in an electronic device according to various embodiments of the disclosure.
Figure 4:
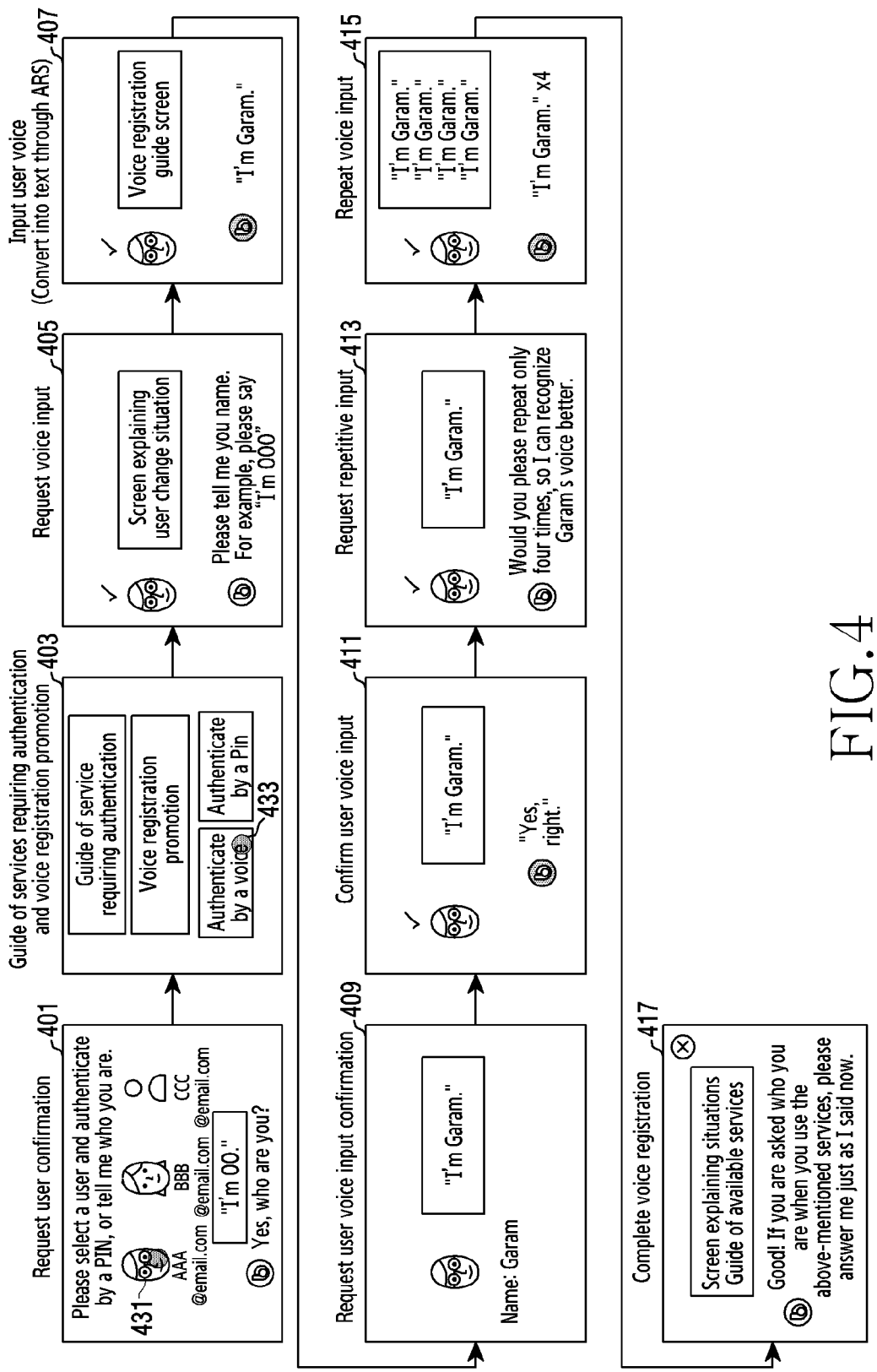
FIG. 4 is a view illustrating screen configurations for registering user authentication information in an electronic device according to various embodiments of the disclosure.
Figure 5:
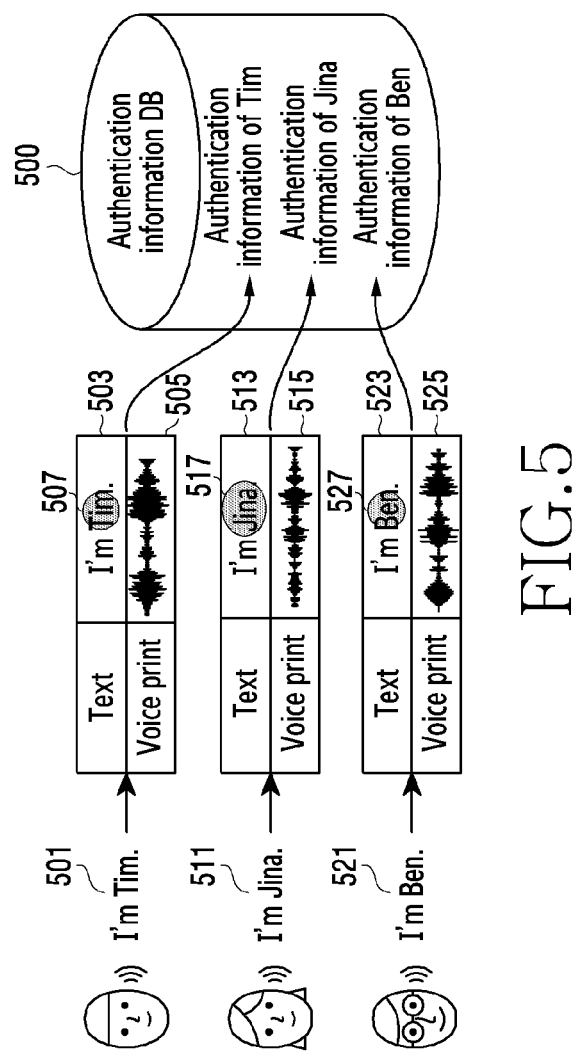
FIG. 5 is a view illustrating an example of registering user authentication information in an electronic device according to various embodiments of the disclosure.

FIG. 3 illustrates a flowchart 300 for registering user authentication information in an electronic device according to various embodiments of the disclosure. In the following embodiments, operations may be performed in sequence, but may not necessarily be performed in sequence. For example, the order of the operations may be changed and at least two operations may be performed in parallel. The operations illustrated by dashed lines in FIG. 3 may be omitted according to an embodiment. Herein, the electronic device may be the electronic device 101 of FIG. 1. The operations of FIG. 3 will be described below with reference to FIGS. 4 and 5. FIG. 4 illustrates screen configurations for registering user authentication information in an electronic device according to various embodiments of the disclosure. FIG. 5 illustrates an example of registering user authentication information in an electronic device according to various embodiments of the disclosure.

According to various embodiments, in operation 301, the electronic device (for example, the processor 120) may detect a user authentication information registration event. The event for registering user authentication information may occur on the basis of at least one of detection of an unregistered identification word, detection of an unregistered user, or detection of a voice command to request registration, detection of a voice command to request execution of a service related to a user in a state where user authentication information is not registered, a user input through an input device (for example, a mouse or a keyboard), a request from an external electronic device through the interface 177, or a user input through a touch circuit and/or a pressure sensor of the display device 160.

According to various embodiments, in operation 303, the electronic device (for example, the processor 120) may acquire user account information. According to an embodiment, the processor 120 of the electronic device may display a user interface through which user account information is inputted on the display device 160, and may acquire user account information on the basis of a user input through the displayed user interface. According to an embodiment, the processor 120 of the electronic device may display pieces of user account information registered at the electronic device 101 and/or the server 108 connected to the electronic device 101 on the display device 160, and may detect a user input of selecting any one piece of information of the displayed user account information. The processor 120 of the electronic device may identify the user account information selected by the user input as user account information for registering user authentication information. For example, the processor 120 of the electronic device may display three pieces of user account information already registered on the display device 160 as shown in a first screen configuration 401 of FIG. 4, and may identify user account information "Garam@samsung.com" selected by a user input 431 as user account information for registering user authentication information.

According to various embodiments, in operation 305, the electronic device (for example, the processor 120) may request the user to speak an identification word. According to an embodiment, the processor 120 of the electronic device may output a message and/or a signal requesting the user to speak a voice command including an identification word that can identify the user. For example, the processor 120 of the electronic device may display a message "Tell me who you are" on the display device 160 while outputting a voice signal "Who are you?" as shown in the first screen configuration 401 of FIG. 4. The processor 120 of the electronic device may display guide information regarding the voice command, "I'm OO," thereby inducing the user to speak a voice command such as "I'm Ben." In another example, when the user account information is acquired, the processor 120 of the electronic device may display, on the display device 160, a user interface to request selection of any one of a voice authentication method, which registers a voice including a name as authentication information, or a Pin authentication method which registers a Pin as authentication information, as shown in a second screen configuration 403 of FIG. 4. When voice authentication is selected by a user input 433, the processor 120 of the electronic device may output a voice signal requesting the user to tell user's name which is an identification word, while displaying the user account information, as shown in a third screen configuration 405 of FIG. 4. The voice signal requesting the user to tell the name which is the identification word may include guide information regarding a voice command that the user should speak.

According to various embodiments, in operation 307, the electronic device (for example, the processor 120) may receive a voice command including an identification word. According to an embodiment, the processor 120 of the electronic device may receive a voice command spoken by the user through the input device 150 (for example, a microphone). For example, as shown in a fourth screen configuration 407 of FIG. 4, a voice command including an identification word "Garam", such as "I'm Garam," may be acquired. According to an embodiment, when the user authentication information registration event of operation 301 is detected by detection of an unregistered identification word, the processor 120 of the electronic device may omit operation 305 and/or operation 307 since the identification word is already acquired.

According to various embodiments, in operation 309, the electronic device (for example, the processor 120) may acquire the identification word and reference voice print information. According to an embodiment, the processor 120 of the electronic device may recognize and analyze the received voice command, and may convert the voice command into a text, and may acquire the identification word and the voice print information from the text and may determine the acquired voice print information as reference voice print information regarding the acquired identification word. For example, as shown in FIG. 5, the processor may acquire text information 503 "I'm Tim" and reference voice print information 505 from a voice command 501 "I'm Tim," and may acquire an identification word "Tim 507" from the text information 503. In another example, as shown in FIG. 5, the processor may acquire text information 513 "I'm Jina" and reference voice print information 515 from a voice command 511 "I'm Jina," and may acquire an identification word "Jina 517" from the text information 513. In still another example, as shown in FIG. 5, the processor may acquire text information 523 "I'm Ben" and reference voice print information 525 from a voice command 521 "I'm Ben," and may acquire an identification word "Ben 527" from the text information 523. According to an embodiment, the processor 120 of the electronic device may output a message and/or a signal indicating a result of recognition of the voice command, and may request the user to confirm whether the voice command spoken by the user is normally recognized. The message and/or the signal indicating the result of recognition of the voice command may be generated on the basis of the text information and/or the identification word acquired from the voice command. For example, the processor 120 of the electronic device may output a voice signal "You are Garam, right?" as shown in a fifth screen configuration 409 of FIG. 4, and in response to this, may receive a voice command indicating that the voice command is normally recognized, such "Right!", as shown in a sixth screen configuration 411 of FIG. 4. According to an embodiment, the processor 120 of the electronic device may request the user to repeatedly speak the same voice command including the same identification word in order to increase accuracy of reference voice print information to be registered, and may acquire the reference voice print information from the voice command repeatedly received by the repetitive speech. For example, the processor 120 of the electronic device may output a voice signal requesting the user to repeatedly input the same voice command as shown in a seventh screen configuration 413 of FIG. 4, and in response to this, may repeatedly receive the voice command "I'm Garam" multiple times as shown in an eighth screen configuration 415 of FIG. 4.

According to various embodiments, in operation 311, the electronic device (for example, the processor 120) may register the identification word and the reference voice print information acquired as authentication information regarding the user account. According to an embodiment, the processor 120 of the electronic device may associate the identification word and the reference voice print information with each other, and may store the associated identification word and reference voice print information in the memory 130 as authentication information of the user regarding the user account. For example, as shown in FIG. 5, the identification word 507 "Tim" and the reference voice print information 505 acquired from the voice command 501 "I'm Tim" may be stored and registered at an authentication information DB 500 as authentication information of Tim. In another example, as shown in FIG. 5, the identification word 517 "Jina" and the reference voice print information 515 acquired from the voice command 511 "I'm Jina" may be stored and registered at the authentication information DB 500 as authentication information of Jina. According to an embodiment, the processor 120 of the electronic device may display a user interface indicating that user authentication information is successfully registered on the display device 160. For example, the processor 120 of the electronic device may output a voice signal indicating that the user authentication information is registered and authentication is possible through a voice command including the identification word afterward as shown in a last screen configuration 417 of FIG. 4. According to an embodiment, the processor 120 of the electronic device may designate the text acquired from the voice command as a text for user authentication, and may store the designated text along with the authentication information of the user. The text for user authentication may be provided as a guide voice command when an additional speech and/or a speech including an identification word of the user is requested. According to an embodiment, when the user registration event of operation 301 is detected on the basis of a voice command to request execution of a new service, the processor 120 of the electronic device may execute a service corresponding to the voice command after registering the user authentication information, and may provide a user interface related to the executed service.

Figure 6:
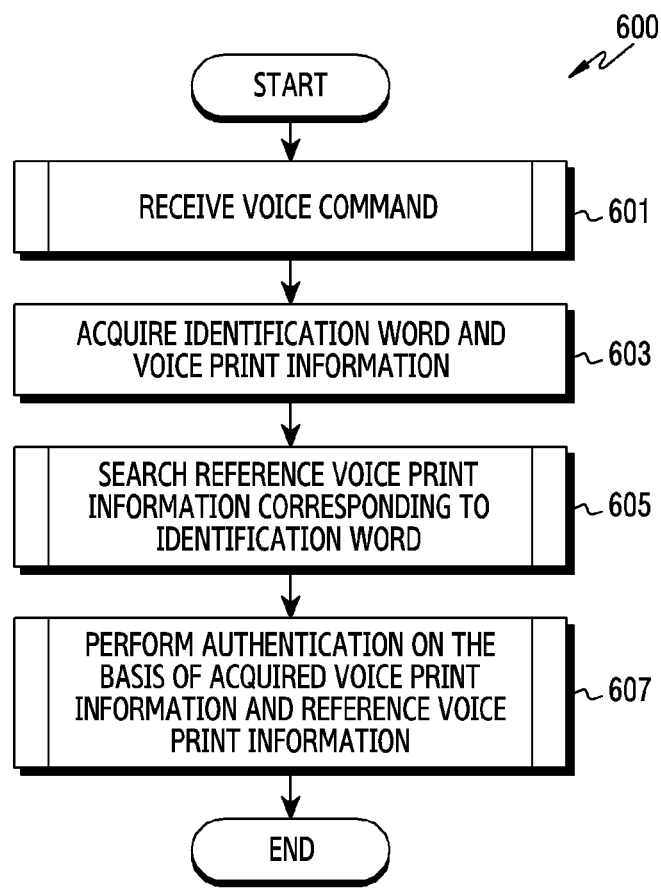
FIG. 6 is a flowchart for performing user authentication in an electronic device according to various embodiments of the disclosure.
Figure 7:
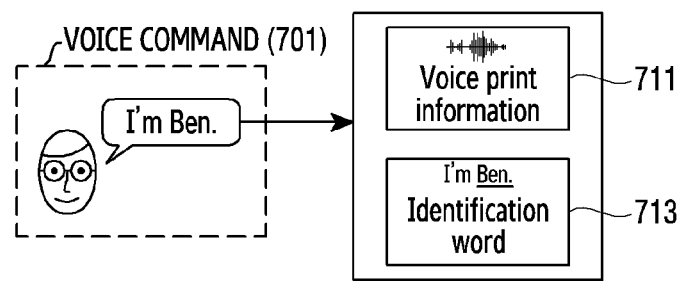
FIG. 7 is a view illustrating an example of acquiring an identification word and voice print information from a voice command in an electronic device according to various embodiments.

FIG. 6 illustrates a flowchart 600 for performing user authentication in an electronic device according to various embodiments of the disclosure. In the following embodiment, operations may be performed in sequence, but may not necessarily be performed in sequence. For example, the order of the operations may be changed and at least two operations may be performed in parallel. Herein, the electronic device may be the electronic device 101 of FIG. 1. The operations of FIG. 6 will be described below with reference to FIG. 7. FIG. 7 illustrates an example of acquiring an identification word and voice print information from a voice command in an electronic device according to various embodiments of the disclosure.

According to various embodiment, in operation 601, the electronic device (for example, the processor 120) may receive a voice command. According to an embodiment, the processor 120 of the electronic device may receive the voice command through the input device 150 (for example, a microphone). For example, the processor 120 of the electronic device may receive a voice command "I'm Ben" as shown in FIG. 7. A detailed operation related to receiving a voice command will be described below with reference to FIG. 8.

According to various embodiments, in operation 603, the electronic device (for example, the processor 120) may acquire an identification word and voice print information. According to an embodiment, the processor 120 of the electronic device may convert the received voice command into a text, and may acquire the identification word and the voice print information from the converted text. For example, the processor 120 of the electronic device may acquire an identification word 713 "Ben" from a text corresponding to a voice command 701 "I'm Ben," and may acquire voice print information 711 regarding "I'm Ben," as shown in FIG. 7.

According to various embodiments, in operation 605, the electronic device (for example, the processor 120) may search reference voice print information corresponding to the identification word. According to an embodiment, the processor 120 of the electronic device may search reference voice print information corresponding to the identification word acquired from the voice command, from among pieces of reference voice print information regarding a plurality of users which are registered at the memory 130. A detailed operation related to searching the reference voice print information will be described below with reference to FIG. 11.

According to various embodiments, in operation 607, the electronic device (for example, the processor 120) may perform user authentication on the basis of the acquired voice print information and the reference voice print information. According to an embodiment, the processor 120 of the electronic device may determine a matching ratio by comparing the voice print information acquired from the inputted voice command and the searched reference voice print information, and may determine whether user authentication succeeds on the basis of the matching ratio. According to an embodiment, the processor 120 of the electronic device may determine whether user authentication succeeds, on the basis of whether the determined matching ratio corresponds to a pre-set reference range. For example, when the matching ratio corresponds to a first reference range, the processor 120 may determine that user authentication succeeds, and may control a function corresponding to the voice command to be performed. In another example, when the matching ratio does not correspond to the first reference range and corresponds to a second reference range, the processor 120 may defer determining whether user authentication succeeds, and may output a message and/or a signal requesting an additional speech. The message and/or the signal requesting the additional speech may be a message and/or a signal requesting the user to speak a voice command including the identification word. In still another example, when the matching ratio does not correspond to the first reference range and the second reference range, the processor 120 of the electronic device may determine user authentication failure, and may output a message and/or a signal indicating that user authentication fails. A detailed operation related to user authentication will be described below with reference to FIG. 13.

Figure 8:
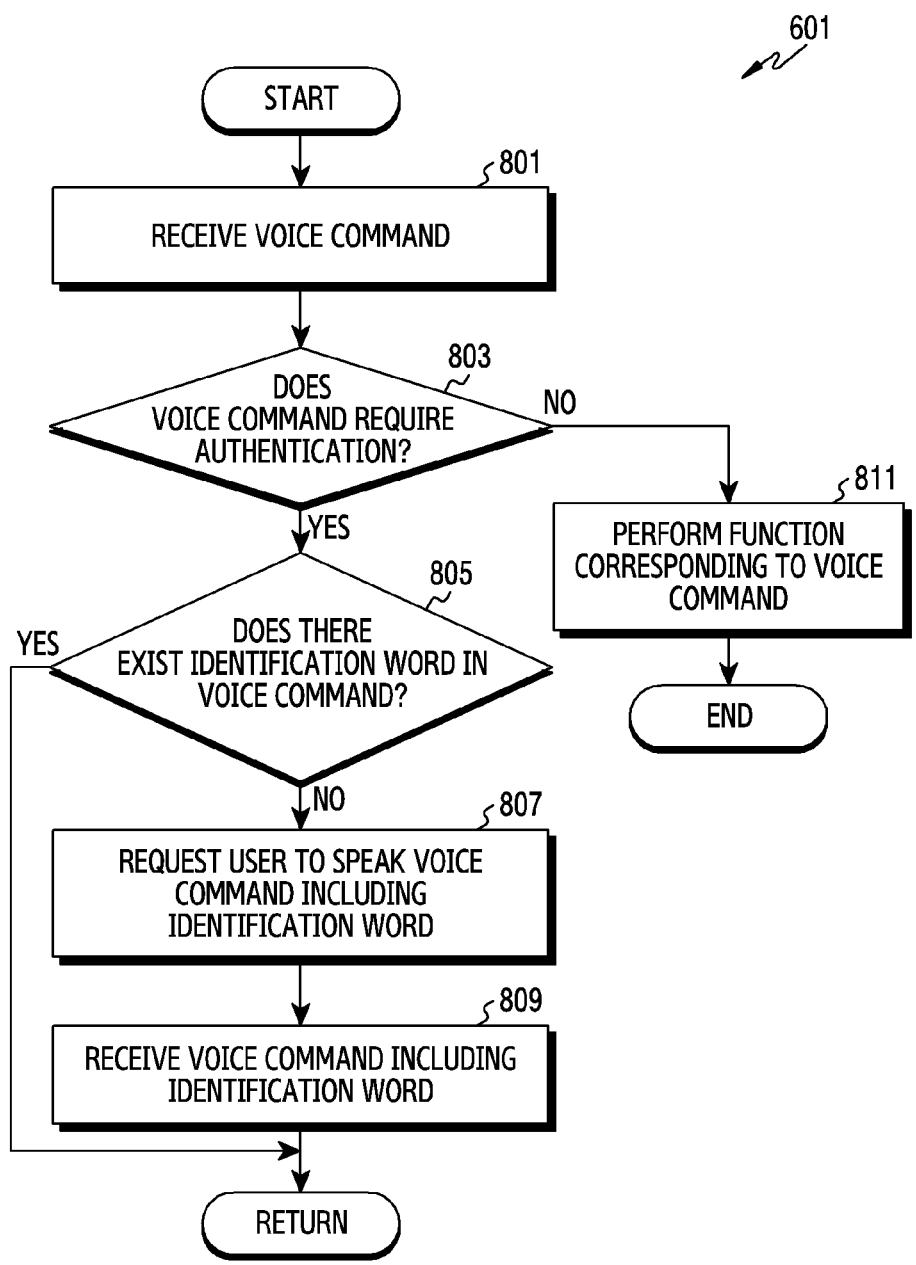
FIG. 8 is a flowchart for processing a voice command on the basis of whether authentication is required in an electronic device according to various embodiments of the disclosure.
Figure 9A:
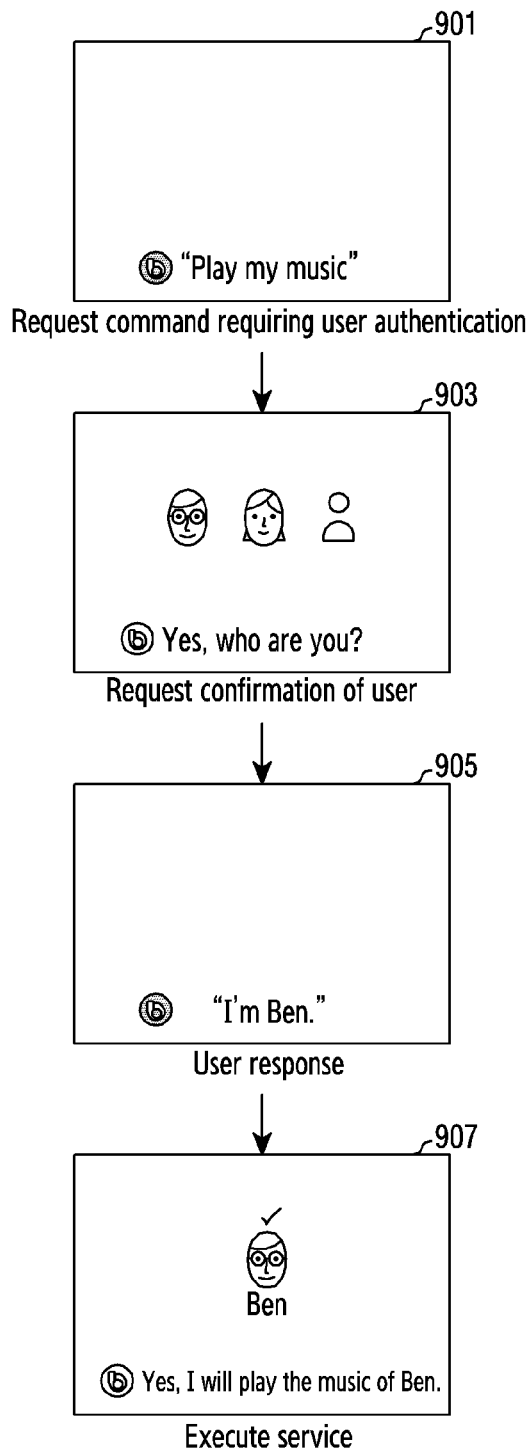
FIGS. 9A to 9C are views illustrating screen configurations for processing a voice command which requires authentication in an electronic device according to various embodiments of the disclosure.
Figure 9B:
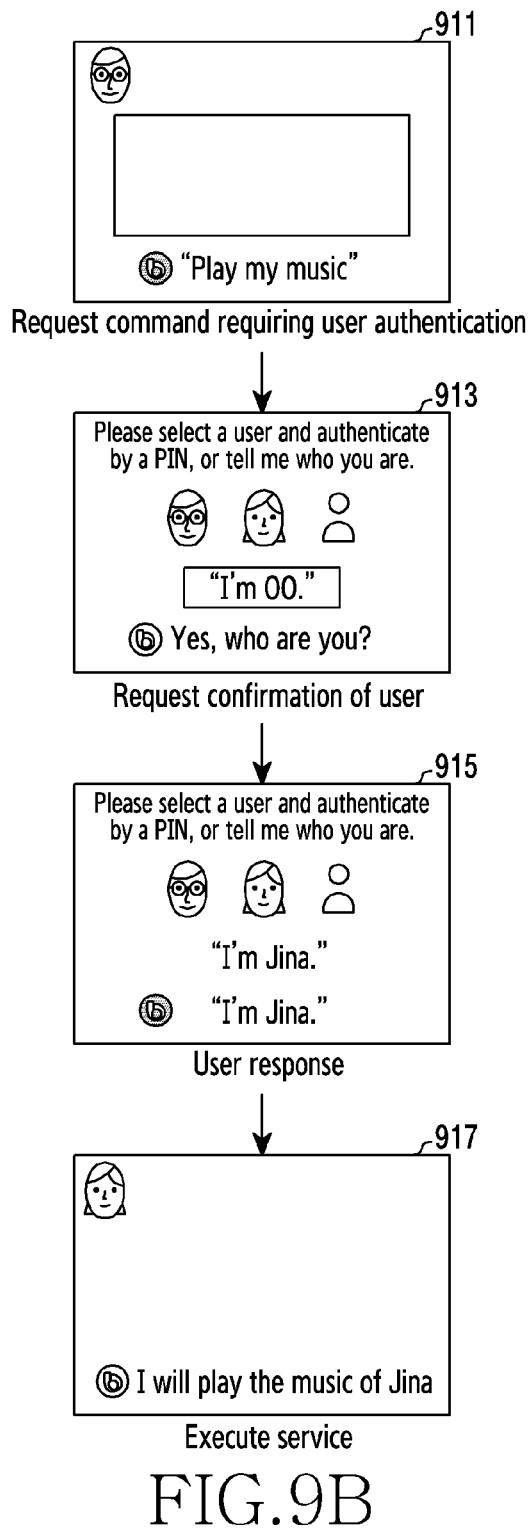
Figure 9C:
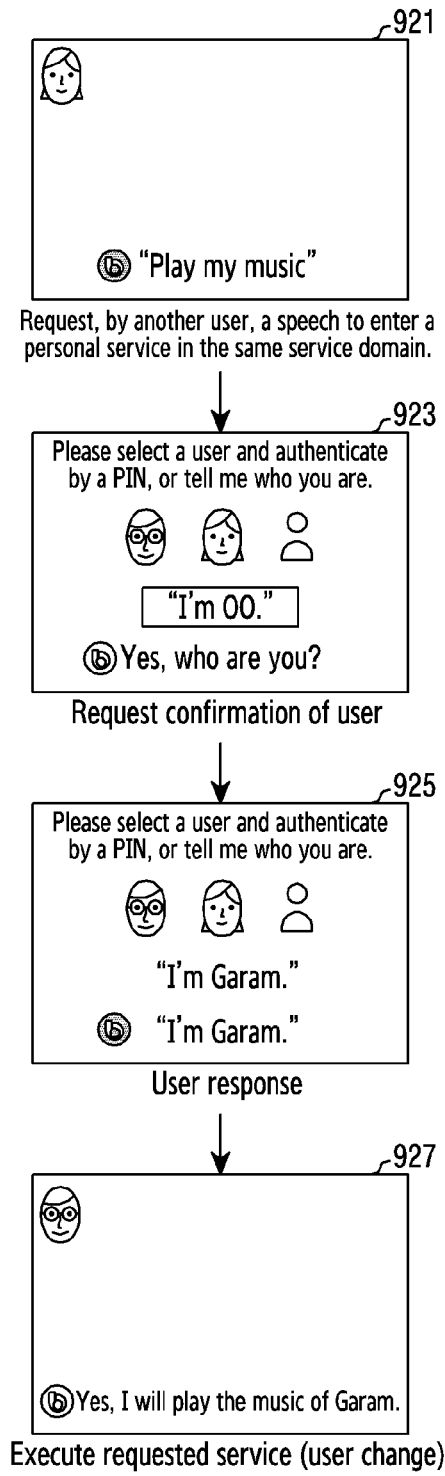
Figure 10:
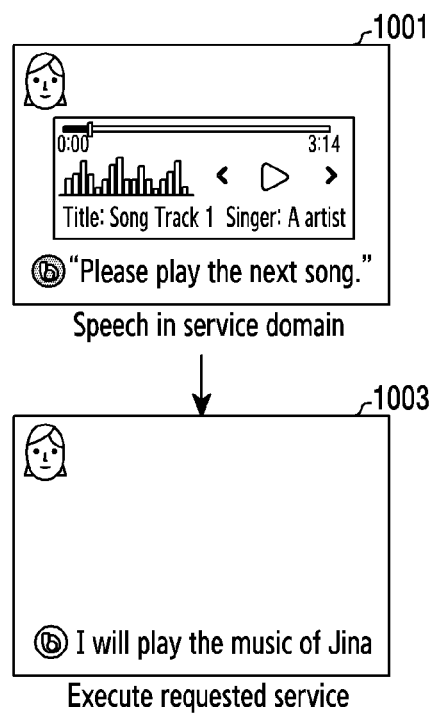
FIG. 10 is a view illustrating screen configurations for processing a voice command which does not require authentication in an electronic device according to various embodiments of the disclosure.

FIG. 8 illustrates a flowchart 601 for processing a voice command on the basis of whether authentication is required in an electronic device according to various embodiments. Operations of FIG. 8 described below may be at least some of detailed operations of operation 601 of FIG. 6. In the following embodiment, the operations may be performed in sequence, but may not necessarily be performed in sequence. For example, the order of the operations may be changed and at least two operations may be performed in parallel. Herein, the electronic device may be the electronic device 101 of FIG. 1. The operations of FIG. 8 will be described hereinbelow with reference to FIGS. 9A to 9C and FIG. 10. FIGS. 9A to 9C illustrate screen configurations for processing a voice command which requires authentication in an electronic device according to various embodiments of the disclosure. FIG. 10 illustrates screen configurations for processing a voice command that does not require authentication in an electronic device according to various embodiments of the disclosure.

According to various embodiments, in operation 801, the electronic device (for example, the processor 120) may receive a voice command. For example, the processor 120 of the electronic device may receive the voice command as described in operation 601 of FIG. 6.

According to various embodiments, in operation 803, the electronic device (for example, the processor 120) may determine whether the received voice command is a voice command that requires user authentication. For example, when the received voice command is a voice command to request execution of a new service (or application), a voice command including a pre-designated text, a voice command related to a service (or an application) requiring security, a voice command requiring connection with an account of a specific user, or a voice command including an identification word, the processor 120 of the electronic device may determine that the inputted voice command is a voice command requiring user authentication. For example, when a voice command "Play my music" is received as shown in a first screen configuration 901 of FIG. 9A, a first screen configuration 911 of FIG. 9B, and/or a first screen configuration 921 of FIG. 9C, the processor 120 of the electronic device may determine that user authentication is required to execute music related to a user speaking the voice command. In another example, when a voice command "Play the next song" is received in the middle of executing music as shown in a first screen configuration 1001 of FIG. 10, the processor 120 of the electronic device may determine that user authentication is not required since the voice command is a voice command for executing the next song of a currently replayed song.

According to various embodiments, in response to the received voice command being the voice command requiring user authentication, the electronic device (for example, the processor 120) may determine whether there exists an identification word in the voice command in operation 805. According to an embodiment, the processor 120 of the electronic device may determine whether the received voice command includes an identification word for user authentication. For example, the processor 120 of the electronic device may convert the received voice command into a text, and may determine whether there is an identification word regarding the user by analyzing the converted text.

According to various embodiments, when there does not exist an identification word in the voice command, the electronic device (for example, the processor 120) may request the user to speak a voice command including an identification word in operation 807. According to an embodiment, the processor 120 of the electronic device may display information regarding pre-registered users through the display device 160, and may output a voice signal requesting the user to additionally speak a voice command including an identification word. For example, as shown in a second screen configuration 903 of FIG. 9A, the processor 120 of the electronic device may display three pieces of user account information already registered on the screen, and may output a voice signal inducing the user to speak a voice command including an identification word, such "Yes, who are you?", through the sound output device 155 (for example, a speaker). According to an embodiment, the processor 120 of the electronic device may output the voice signal requesting the user to additionally speak the voice command including the identification word, while displaying information regarding the pre-registered users and guide information (for example, a guide voice command) regarding an additional speech on the display device 160. For example, as shown in a second screen configuration 913 of FIG. 9B, or a third screen configuration 923 of FIG. 9C, the processor 120 of the electronic device may display the three pieces of user account information already registered and a message requesting the user to additionally speak "I'm 00" on the screen, and may output a voice signal inducing the user to speak a voice command including an identification word, such as "Yes, who are you?", through the sound output device 155 (for example, a speaker).

According to various embodiments, in operation 809, the electronic device (for example, the processor 120) may receive a voice command including an identification word. According to an embodiment, the processor 120 of the electronic device may receive the voice command including the identification word through the input device 150 (for example, a microphone). For example, as shown in third screen configurations 905, 915, 925 of FIGS. 9A to 9C, a voice command including an identification word, such as "I'm Ben," "I'm Jina," or "I'm Garam," may be received According to an embodiment, the processor 120 of the electronic device may perform user authentication on the basis of the voice command including the identification word, as explained in operations 603 to 607 of FIG. 6, and then may perform a function corresponding to the voice command acquired in operation 801. For example, as shown in fourth screen configurations 907, 917, 927 of FIGS. 9A to 9C, the processor may perform a function corresponding to the initially inputted voice command, and may output a voice signal indicating that the corresponding function is performed.

According to various embodiments, in response to the received voice command being a voice command that does not require user authentication, the electronic device (for example, the processor 120) may perform the function corresponding to the voice command in operation 811. For example, when the voice command "Play the next song" is received in the state where music is currently replayed as shown in the first screen configuration 1001 of FIG. 10, the processor 120 of the electronic device may determine that user authentication is not required, and may guide that the next song will be replayed and may replay the next song of the currently replayed song as shown in a second screen configuration 1003 of FIG. 10.

In the description of FIGS. 6 and 8, it is illustrated that, when there does not exist an identification word in the voice command requiring user authentication, the electronic device requests the user to speak a voice command including an identification word, and, in response to this, receives the voice command including the identification word, and then perform user authentication. However, according to various embodiments, when a voice command requiring user authentication is received in a state where an application related to a specific user is being executed, the processor 120 of the electronic device may perform user authentication regardless of whether the voice command includes an identification word or not. For example, when a voice command such as "Open my gallery" is received while music of a user "Jim." is being executed, the processor 120 of the electronic device may perform user authentication by comparing reference voice print information related to "Jim." and voice print information of "Open my gallery" since the user corresponding to the currently executed service (or application) is "Jina." The processor 120 of the electronic device may determine whether user authentication succeeds, on the basis of whether a matching ratio indicating a result of comparing the reference voice print information related to "Jina" and the voice print information of "Open my gallery" corresponds to a fifth reference range. According to an embodiment, the fifth reference range may be set to the same value as the first reference range, or may be set to a different value. For example, since a text corresponding to the reference voice print information related to "Jina" and a text of "Open my gallery" are different it may be determined whether user authentication succeeds by using the fifth reference range which is different from the first reference range.

Figure 11:
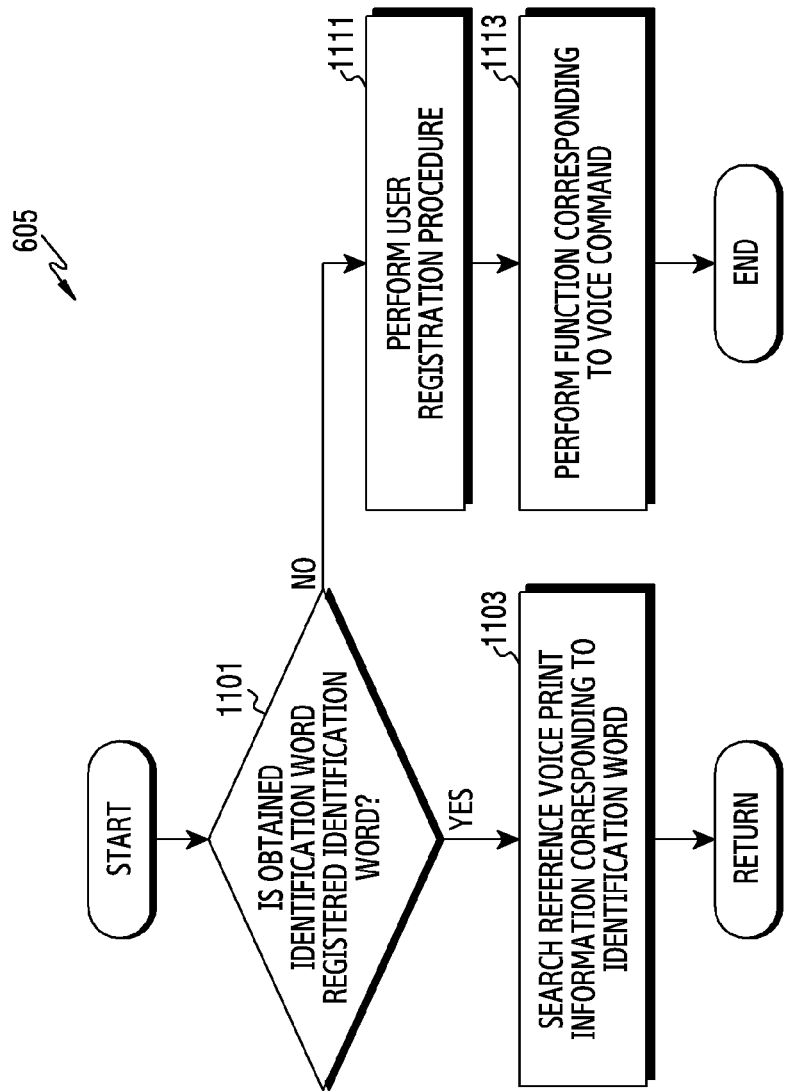
FIG. 11 is a flowchart for searching reference voice print information on the basis of whether an identification word is registered in an electronic device according to various embodiments.
Figure 12:
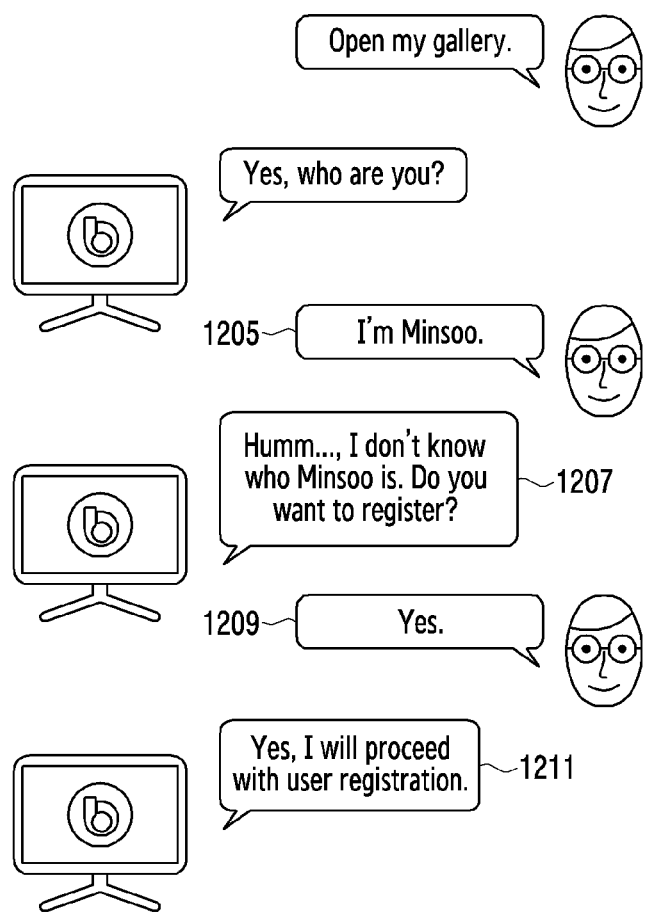
FIG. 12 is a view illustrating an example of registering an unregistered identification word in an electronic device according to various embodiments of the disclosure.

FIG. 11 illustrates a flowchart for searching reference voice print information on the basis of whether an identification word is registered in an electronic device according to various embodiments of the disclosure. Operations of FIG. 11 described below may be at least some of detailed operations of operation 605 of FIG. 6. In the following embodiments, the operations may be performed in sequence, but may not necessarily be performed in sequence. For example, the order of the operations may be changed and at least two operations may be performed in parallel. Herein, the electronic device may be the electronic device 101 of FIG. 1. The operations of FIG. 11 will be described below with reference to FIG. 12. FIG. 12 illustrates an example of registering an unregistered identification word in an electronic device according to various embodiments of the disclosure.

According to various embodiments, in operation 1101, the electronic device (for example, the processor 120) may determine whether an identification word acquired from a voice command is a registered identification word in operation 1101. According to an embodiment, the processer 120 of the electronic device may determine whether the identification word acquired from the voice command is identical to any one of identification words registered at the memory 130 as user authentication information. When there does not exist an identification word identical to the acquired identification word from among the identification words registered at the memory 130, the processor 120 of the electronic device may determine that the acquired identification word is an unregistered user and/or an unregistered identification word. When there exists an identification word identical to the acquired identification word from among the identification words registered at the memory 130, the processor 120 of the electronic device may determine that the acquired identification word is the registered identification word.

According to various embodiments, in response to the acquired identification word being the registered identification word, the electronic device (for example, the processor 120) may search reference voice print information corresponding to the identification word in operation 1103. The operation of searching the reference voice print information may be performed as described in operation 605 of FIG. 6.

According to various embodiments, in response to the acquired identification word being the unregistered identification word, the electronic device (for example, the processor 120) may perform a user registration procedure in operation 1111. According to an embodiment, in response to the acquired identification word being the unregistered identification word, the processor 120 of the electronic device may output a message and/or a signal requesting registration of the user and/or the identification word. In response to the message and/or the signal requesting registration of the user and/or the identification word being outputted, the processor 120 of the electronic device may receive an input of requesting registration of the user and/or the identification word, and may register user authentication information as described in FIG. 3. For example, as shown in FIG. 12, when an identification word "Minsoo" is acquired from a voice command 1205 "I'm Minsoo" but the identification word "Minsoo" is not registered, the processor 120 of the electronic device may output a voice signal asking whether to perform the user registration procedure (for example, "Hum . . . I don't know who Minsoo is. Do you want to register?" 1207). The processor 120 of the electronic device may perform the user registration procedure on the basis of a user response (for example, "Yes, Ok" 1209) to the question of whether the user registration procedure is performed, and may output a voice signal indicating whether the user registration procedure is performed (for example, "Yes, I will proceed with user registration." 1211).

According to various embodiments, the electronic device (for example, the processor 120) may perform a function corresponding to the voice command in operation 1113. According to an embodiment, the voice command may be the voice command acquired in operation 601 of FIG. 6.

Figure 13:
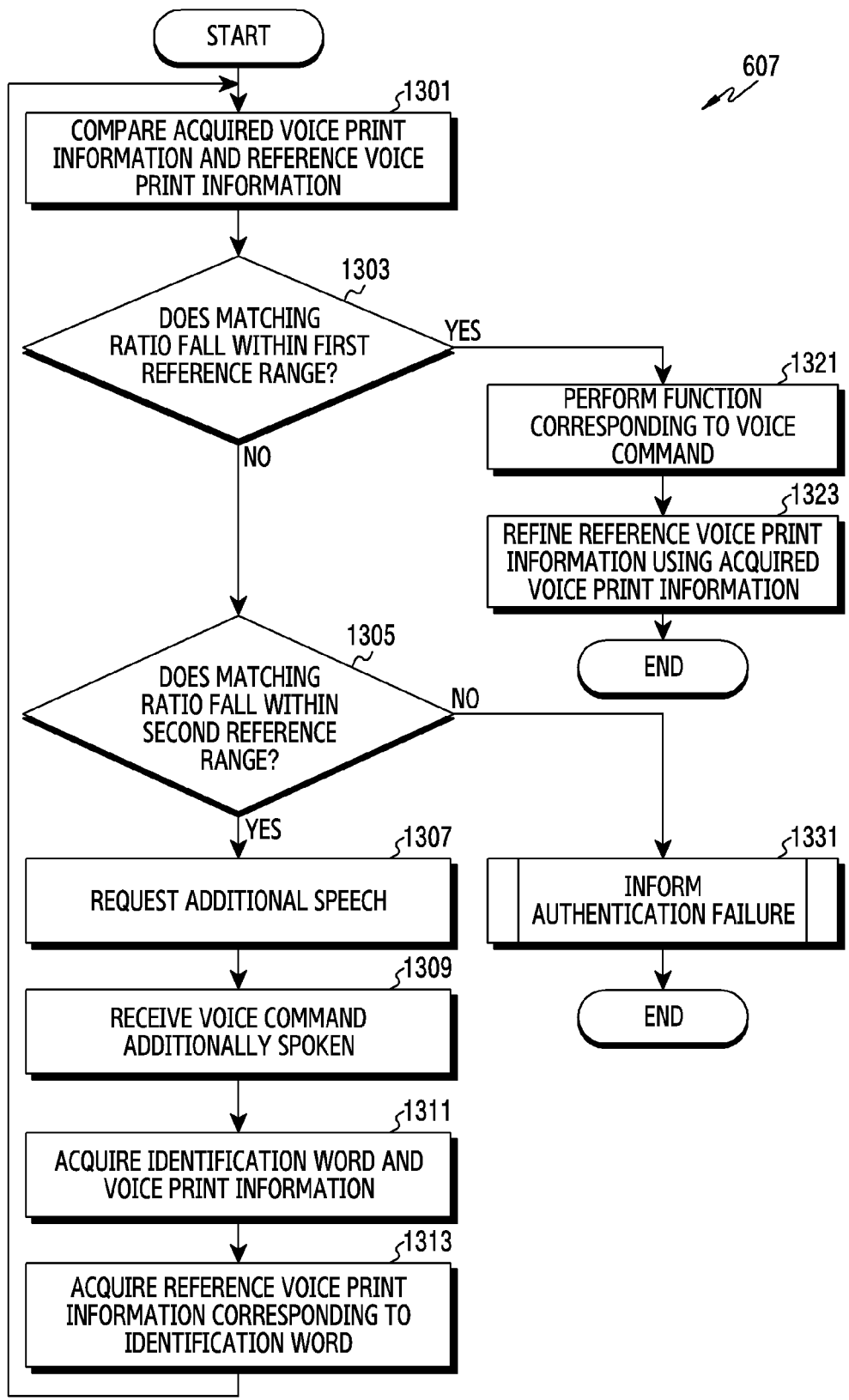
FIG. 13 is a flowchart for performing user authentication on the basis of a matching ratio between voice print information of a voice command and reference voice print information in an electronic device according to various embodiments of the disclosure.
Figure 14:
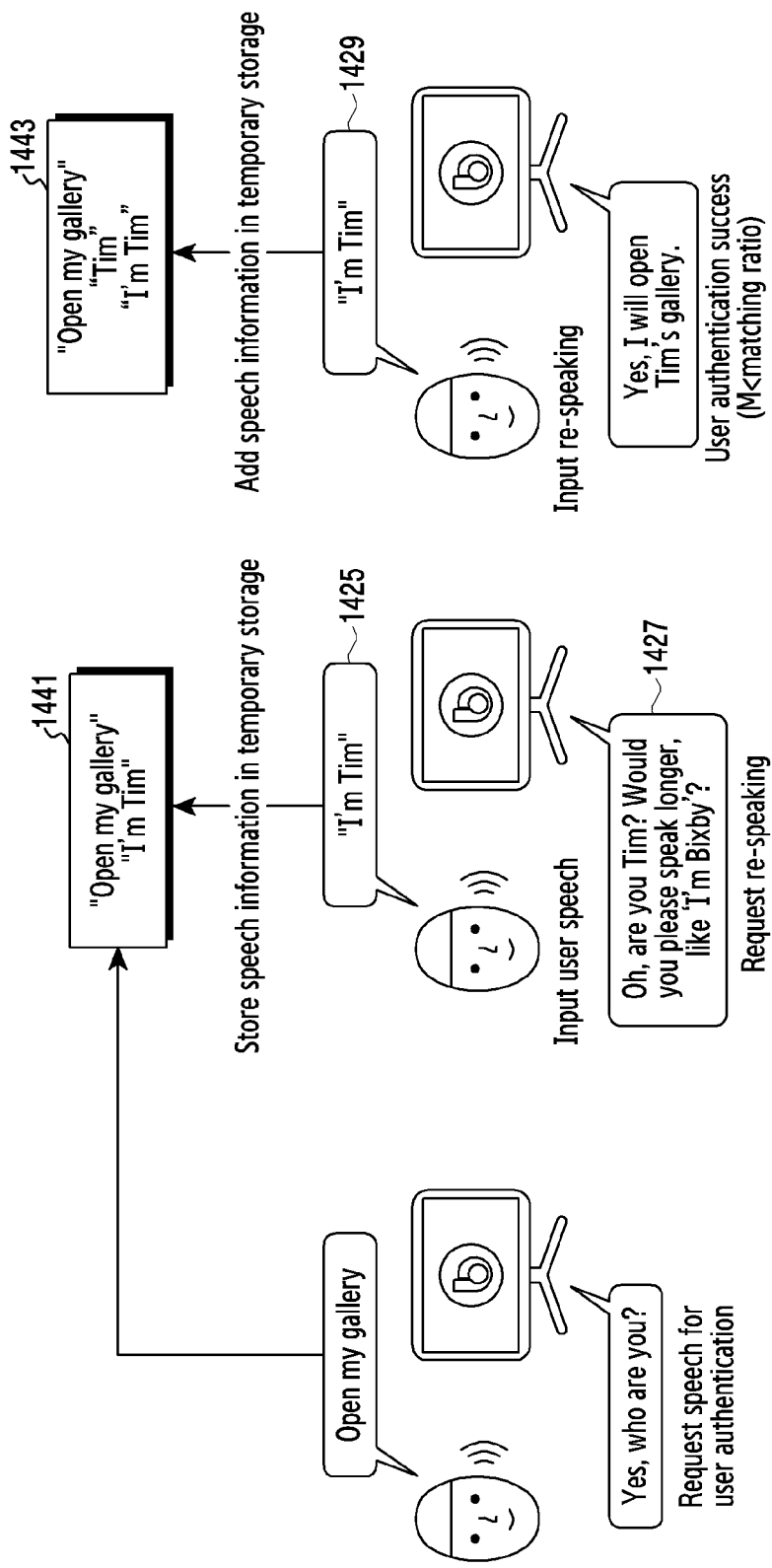
FIG. 14 is a view illustrating an example of requesting an additional speech in an electronic device according to various embodiments of the disclosure.

FIG. 13 illustrates a flowchart 607 for performing user authentication on the basis of a matching ratio between voice print information of a voice command and reference voice print information in an electronic device according to various embodiments of the disclosure. Operations of FIG. 13 described below may be at least some of detailed operations of operation 607 of FIG. 6. In the following embodiments, the operations may be performed in sequence, but may not necessarily be performed in sequence. For example, the order of the operations may be changed and at least two operations may be performed in parallel. Herein, the electronic device may be the electronic device 101 of FIG. 1. The operations of FIG. 13 will be described below with reference to FIG. 14. FIG. 14 illustrates an example of requesting an additional speech in an electronic device according to various embodiments of the disclosure.

According to various embodiments, in operation 1301, the electronic device (for example, the processor 120) may compare voice print information acquired from a voice command, and reference voice print information. According to an embodiment, the processor 120 of the electronic device may acquire a matching ratio indicating how much the two pieces of voice print information are identical to each other, by comparing the voice print information of the voice command and the reference voice print information.

According to various embodiments, in operation 1303, the electronic device (for example, the processor 120) may determine whether the matching ratio falls within a first reference range. For example, the processor 120 of the electronic device may determine whether the matching ratio is greater than or equal to a pre-designated first reference value.

According to various embodiments, when the matching ratio does not fall within the first reference range, the electronic device (for example, the processor 120) may determine whether the matching ratio falls within a second reference range in operation 1305. For example, when the matching ratio is less than the pre-designated first reference value, the processor 120 of the electronic device may determine whether the matching ratio is greater than or equal to a pre-designated second reference value. The second reference value may be smaller than the first reference value.

According to various embodiment, when the matching ratio falls within the second reference range, the electronic device (for example, the processor 120) may request an additional speech in operation 1307. According to an embodiment, when the matching ratio is less than the first reference value and is greater than or equal to the second reference value, the processor 120 of the electronic device may output a message and/or a signal requesting an additional speech including an identification word. The processor 120 of the electronic device may output a guide voice command regarding the additional speech of the user, thereby inducing the user to speak the guide voice command. For example, as shown in FIG. 14, when a matching ratio regarding a voice command 1425 "Tim" falls within the second reference range, the processor 120 of the electronic device may output a voice signal including a guide voice command "I'm Bixby," such as "Oh, are you Tim? Would you please speak longer, like 'I'm Bixby'?" 1427. According to an embodiment, when the matching ratio falls within the second reference range, the processor 120 of the electronic device may temporarily store a text and voice print information regarding the corresponding voice command, for example, the voice command acquired during operations 601 to 605. For example, the processor 120 of the electronic device may temporarily store a text and/or voice print information regarding "Open my gallery" and "Tim" 1441.

According to various embodiments, the electronic device (for example, the processor 120) may receive a voice command additionally spoken in operation 1309. According to an embodiment, the processor 120 of the electronic device may receive a voice command additionally spoken from the user through the input device 150 within a designated time after requesting the additional speech. For example, as shown in FIG. 14, a voice command 1429 additionally spoken, such as "I'm Tim," may be received.

According to various embodiments, in operation 1311, the electronic device (for example, the processor 120) may acquire an identification word and voice print information from the voice command received by the additional speech. The operation of acquiring the identification word and the voice print information may be performed as described in operation 603 of FIG. 6. According to an embodiment, the processor 120 of the electronic device may temporarily store a text and voice print information regarding the voice command received by the additional speech. For example, the processor 120 of the electronic device may temporarily store the text and/or the voice print information regarding "I'm Tim," along with the text and/or the voice print information regarding the previously inputted voice command, "Open my gallery" and "Tim" (1443).

According to various embodiments, in operation 1313, the electronic device (for example, the processor 120) may acquire reference voice print information corresponding to the identification word. The reference voice print information may be acquired as described in operation 607. After acquiring the reference voice print information, the electronic device (for example, the processor 120) may return to operation 1301 to perform the subsequent operations again.

According to various embodiments, when the matching ratio falls within the first reference range, the electronic device (for example, the processor 120) may perform a function corresponding the voice command in operation 1321. The voice command may be the voice command acquired in operation 601. For example, the processor 120 of the electronic device may perform a function corresponding to the voice command requesting a new service, "Open my gallery," as shown in FIG. 14.

According to various embodiments, in operation 1323, the electronic device (for example, the processor 120) may refine the reference voice print information. According to an embodiment, the processor 120 of the electronic device may refine the reference voice print information by using voice print information of voice commands which are used for the user authentication procedure when user authentication succeeds. The voice print information of the voice commands used for the user authentication procedure may include the voice print information temporarily stored in operation 1305 and operation 1311. According to an embodiment, the processor 120 of the electronic device may refine the reference voice print information on the basis of the voice print information of the voice commands used for the user authentication procedure, by using a deep learning technique. According to an embodiment, the processor 120 of the electronic device may register the voice print information of the voice commands used for the user authentication procedure as additional reference voice print information regarding the corresponding identification word. According to an embodiment, the processor 120 of the electronic device may store text information of the voice commands used for the user authentication procedure in association with the additional reference voice print information.

According to various embodiments, when the matching ratio does not fall within the second reference range, the electronic device (for example, the processor 120) may output a message and/or a signal informing that user authentication fails in operation 1331. According to an embodiment, when the matching ratio corresponds to a third reference range, the processor 120 of the electronic device may output a message and/or a signal indicating that user authentication as to the voice command fails. A detailed operation related to user authentication failure will be described below with reference to FIG. 15.

In the above-described explanation, the additional speech is requested when the matching ratio falls within the second reference range. However, according to various embodiments, the additional speech may be requested on the basis of a length of a text corresponding to a voice command. For example, when the voice command is shorter than a pre-set length or the voice command is shorter than a length of a pre-designated text for user authentication regarding a corresponding identification word, the additional speech may be requested.

Figure 15:
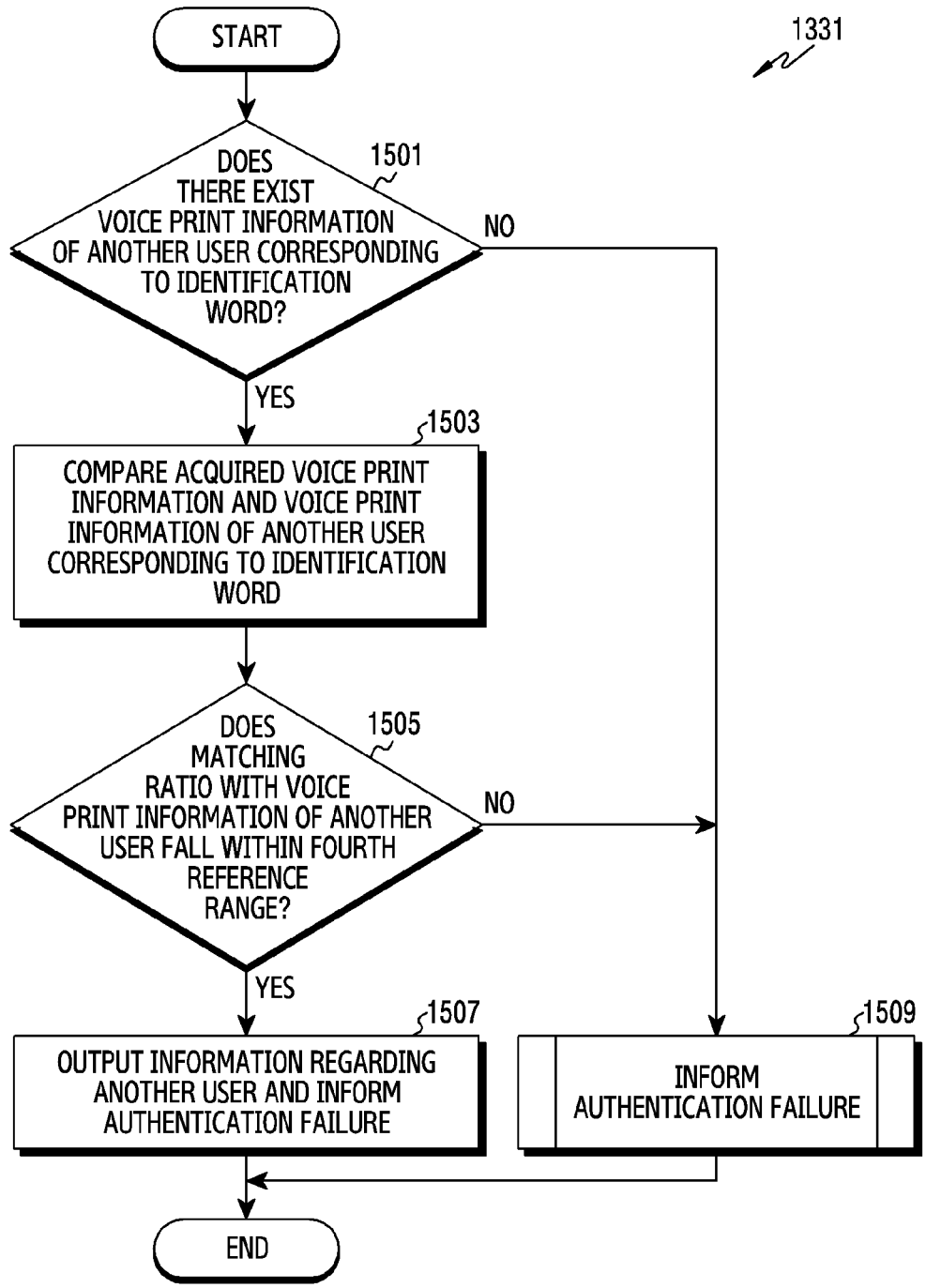
FIG. 15 is a flowchart for performing user authentication on the basis of voice print information of another user in an electronic device according to various embodiments of the disclosure.
Figure 16:
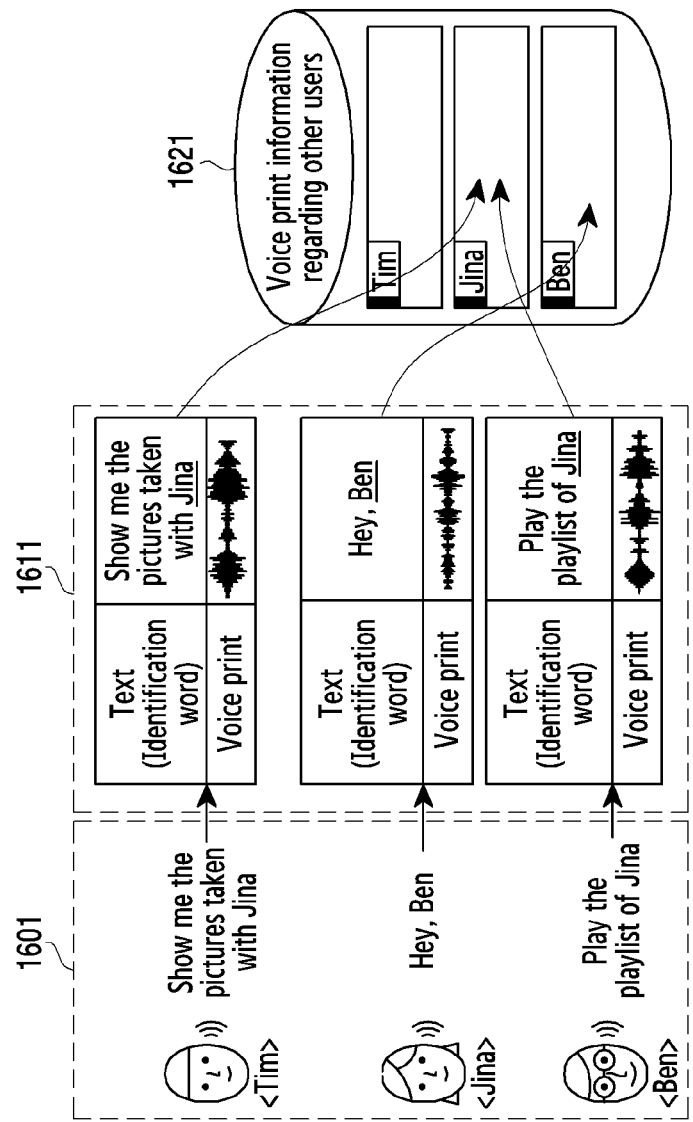
FIG. 16 is a view illustrating an example of storing user voice print information regarding an identification word in an electronic device according to various embodiments of the disclosure.
Figure 17A:
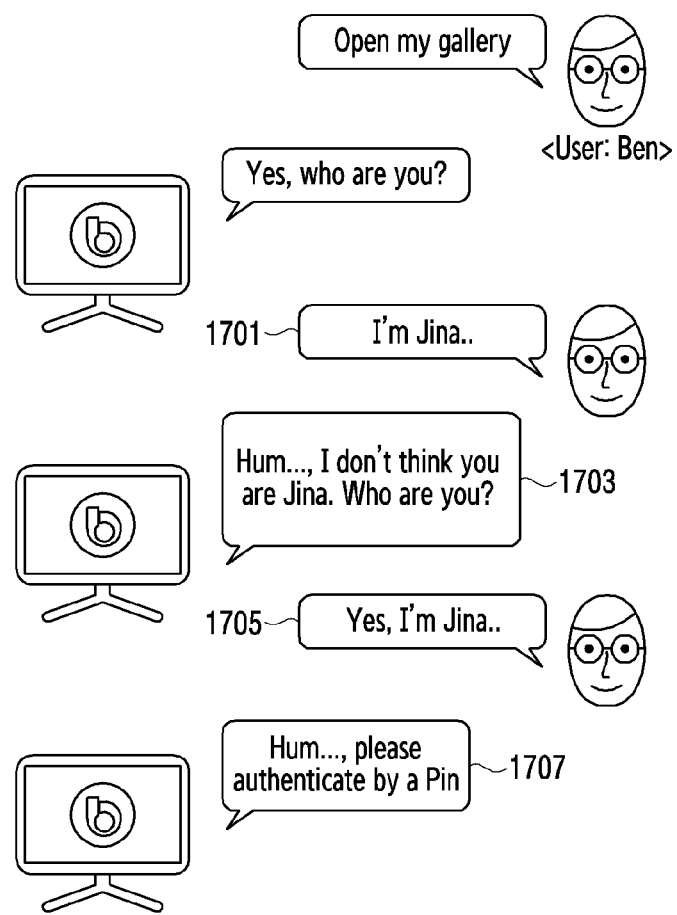
FIGS. 17A and 17B are views illustrating an example of failure of authentication regarding a voice command in an electronic device according to various embodiments of the disclosure.
Figure 17B:
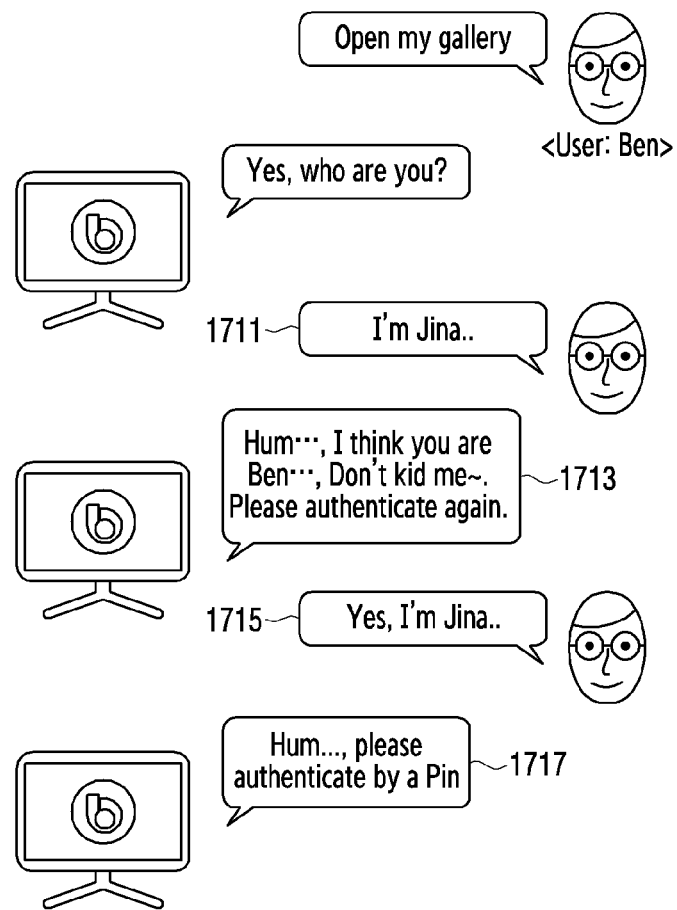

FIG. 15 illustrates a flowchart for performing user authentication on the basis of voice print information of another user in an electronic device according to various embodiments of the disclosure. Operations of FIG. 15 described below may be at least some of detailed operations of operation 1331 of FIG. 13. In the following description, the operations may be performed in sequence, but may not necessarily be performed in sequence. For example, the order of the operations may be changed and at least two operations may be performed in parallel. Herein, the electronic device may be the electronic device 101 of FIG. 1. The operations of FIG. 14 will be described below with reference to FIGS. 16, 17A and 17B. FIG. 16 illustrates an example of storing user voice print information regarding an identification word in an electronic device according to various embodiments of the disclosure. FIGS. 17A and 17B illustrate an example of authentication failure as to a voice command in an electronic device according to various embodiments of the disclosure.

According to various embodiments, in operation 1501, the electronic device (for example, the processor 120) may determine whether there exists voice print information of another user corresponding to an identification word acquired from a voice command in the memory 130. According to an embodiment, the processor 120 of the electronic device may determine whether there exists voice print information of another user corresponding to an identification word acquired from a voice command, on the basis of the voice print DB 230 of other users of the memory 130. For example, as shown in FIG. 16, a voice print information DB 1621 of other users may be acquired from a text and voice print information 1611 of a corresponding voice command when a user succeeding in user authentication speaks a voice command including an identification word of another user, other than the user's own identification word (1601). For example, when a voice command including an identification word of another user "Jina," such as "Show me pictures taken with Jina," is received from the user "Tim" who is authenticated, the processor 120 of the electronic device may acquire a text and voice print information from the corresponding voice command, and may store the text and the voice print information acquired in the voice print information DB of other users as voice print information of Tim regarding the identification word "Jina." In another example, when a voice command including an identification word of another user "Ben," such as "Hey, Ben," is received from the user "Jina" who is authenticated, the processor 120 of the electronic device may acquire a text and voice print information from the corresponding voice command, and may store the text and the voice print information acquired in the voice print information DB of other users as voice print information of Tim regarding the identification word "Jina".

According to various embodiments, when there does not exist voice print information of another user corresponding to the identification word acquired from the voice command, the electronic device (for example, the processor 120) may output a message and/or a signal informing user authentication failure in operation 1509. The message and/or the signal informing the user authentication failure may include a request for re-speaking a voice command including an identification word, or a user authentication request using other methods. The user authentication request using other methods may include an authentication request using a Pin number, an authentication request using biometric information (for example, fingerprint, iris, or face), or an authentication request using a designated pattern (for example, a designated touch pattern for unlocking). These are merely examples, and various embodiments of the disclosure are not limited thereto. According to an embodiment, the message and/or the signal informing the user authentication failure may vary on the basis of the number of times of user authentication failures as to an inputted voice command. For example, when a voice command requiring user authentication is detected and user authentication as to the voice command including an identification word fails once, the processor 120 of the electronic device may output a message and/or a signal requesting re-speaking of a voice command including an identification word while informing the user authentication failure. When user authentication as to an additionally inputted voice command fails again in the state where user authentication fails at least one time, the processor 120 of the electronic device may output a message and/or a signal requesting to perform user authentication in other methods, while informing the user authentication failure. For example, as shown in FIG. 17A, when user authentication as to a voice command including an identification word, "I' am Jina . . . " 1701, fails, the processor 120 of the electronic device may request re-speaking of a voice command including an identification word while informing user authentication failure, by outputting a voice signal such as "Hum, I don't think you are Jina. Who are you?" (1703). When user authentication fails at least one time and user authentication as to a voice command including an identification word, "Yes, I'm Jina . . . " (1705), the processor 120 of the electronic device may request to perform authentication in other methods while informing the user authentication failure by outputting a voice signal such as "Hum . . . , please authenticate by a Pin number" (1707).

According to various embodiments, when there exists voice print information of another user corresponding to the identification word acquired from the voice command, the electronic device (for example, the processor 120) may compare voice print information acquired from the voice command and voice print information of another user corresponding to the identification word in operation 1503. The processor 120 of the electronic device may search the voice print information of another user corresponding to the identification word acquired from the voice command from the voice print DB 230 of other users of the memory 130, and may compare the searched voice print information and the voice print information acquired from the voice command.

According to various embodiments, in operation 1505, the electronic device (for example, the processor 120) may determine whether a matching ratio between the voice print information acquired from the voice command and the voice print information of another user falls within a fourth reference range. The fourth reference range may be set to the same value as the first reference range described in FIG. 13, or may be set to a different value.

According to various embodiments, when the matching ratio between the voice print information acquired from the voice command and the voice print information of another user does not correspond to the fourth reference range, the electronic device (for example, the processor 120) may output the message and/or the signal informing user authentication failure in operation 1509. The message and/or the signal informing the user authentication failure may be configured as described in operation 1509 described above.

According to various embodiments, when the matching ratio between the voice print information acquired from the voice command and the voice print information of another user corresponds to the fourth reference range, the electronic device (for example, the processor 120) may output information of another user while outputting a message and/or a signal informing user authentication failure in operation 1507. According to an embodiment, the message and/or the signal informing the user authentication failure may be configured as described in operation 1509 described above. According to an embodiment, the information of another user may include an identification word of another user. For example, as shown in FIG. 17B, when user authentication as to a voice command "I'm Jina" 1711 including an identification word "Jina" fails, and a matching ratio between voice print information acquired from "I'm Jina" and voice print information of Ben regarding the identification word "Jina" falls within the fourth reference range, the processor 120 of the electronic device may output a voice signal including information regarding another user, such as "Hum . . . , I think you are Ben . . . , Don't kid me~. Please authenticate again." 1713. When user authentication fails at least one time and user authentication as to a voice command including an identification word, "Yes, I'm Jina . . . " 1715, fails, the processor 120 of the electronic device may request to perform authentication in other methods while informing the user authentication failure, by outputting a voice signal such as "Hum . . . , please authenticate by a Pin number." 1715. According to an embodiment, in the state shown in FIG. 17B, when the voice command "Yes, I'm Jina . . . " 1715 is not received and a voice command including the identification word "Ben," "I'm Ben," is received, the processor 120 of the electronic device may perform user authentication in the method described in FIG. 13. When authentication as to the user "Ben" succeeds, the processor 120 of the electronic device may store a text and voice print information of the voice command "I'm Jina" 1711 spoken by Ben as voice print information of Ben regarding the identification word "Jina."

According to various embodiments, an operating method of an electronic device may include: receiving a voice command from an input device; acquiring user identification information and voice print information from the voice command; searching reference voice print information corresponding to the acquired user identification information from among respective pieces of reference voice print information regarding a plurality of users; and performing authentication on the basis of the acquired voice print information and the reference voice print information.

According to various embodiments, performing the authentication may include: determining a matching ratio by comparing the acquired voice print information and the reference voice print information; when the matching ratio correspond to a first designated range, determining that authentication succeeds, and refining the reference voice print information on the basis of the voice print information acquired from the voice command.

According to various embodiments, performing the authentication may further include, when the matching ratio corresponds to a second designated range, outputting an additional speech request message through at least one of a display device and a sound output device.

According to various embodiments, the additional speech request message may include guide information regarding an additional speech.

According to various embodiments, performing the authentication may further include: when the matching ratio corresponds to a third designated ratio, searching voice print information of another user regarding the acquired user identification information; and identifying a user speaking the voice command on the basis of the acquired voice print information and the voice print information of another user.

According to various embodiments, the method may further include, when the matching ratio corresponds to the third designated range, outputting a message including at least one of a user authentication failure and information indicating the identified user.

According to various embodiments, the method may further include, when a length of the received voice command is shorter than a designated length, outputting an additional speech request message through at least one of the display device and the sound output device, and the additional speech request message may include guide information regarding an additional speech.

According to various embodiments, the method may further include: determining whether there exists the user identification information in the received voice command; when there does not exist the user identification information in the received voice command, outputting an additional speech request message regarding a voice command including the user identification information through at least one of the display device and the sound output device; and, in response to the additional speech request message regarding the voice command, receiving a voice command including the user identification information through the input device.

According to various embodiments, the method may further include: detecting a user authentication information registration event; acquiring user account information; acquiring user identification information and reference voice print information from a voice command for the user authentication information registration; and storing the user identification information and the reference voice print information acquired from the voice command for the user authentication information registration in the memory as authentication information regarding the user account information, and the user authentication information registration event may be detected on the basis of at least one of detection of an unregistered identification word, detection of an unregistered user, detection of a voice command to request registration, a request from an external electronic device, a user input through the input device, and a user input through a display device.

The invention claimed is:

1. An electronic device comprising:
   a memory;
   an input device; and
   a processor,
   wherein the processor is configured to:
   receive a voice command of a first user from the input device;
   acquire an identifier indicating the first user and voice print information of the first user from the received voice command;
   search a first reference voice print information including the identifier of the first user from among a plurality of pieces of reference voice print information stored in the memory, wherein the plurality of pieces of reference voice information include identifiers of a plurality of users including the first user, and are generated by the first user;
   perform authentication on the basis of a comparison between the acquired voice print information and the first reference voice print information;
   based on the authentication failing, retrieve second reference voice print information from among the plurality of pieces of reference voice print information, wherein the second reference voice print information includes another identifier indicating a second user and is generated by the first user; and
   perform authentication of the first user based on a comparison between the acquired voice print information and the second reference voice print information,
   wherein the second reference voice print information is acquired from a previous voice command of the first user received in a state of successful authentication and stored in the memory.

2. The electronic device of claim 1, further comprising at least one of a display device and a sound output device,
   wherein the processor is configured to:
   determine a matching ratio by comparing the acquired voice print information with the first reference voice print information or the second reference voice print information;
   when the matching ratio correspond to a first designated range, determine that authentication succeeds, and
   refine the reference voice print information about each of the plurality of users on the basis of the voice print information acquired from the received voice command.

3. The electronic device of claim 2, wherein, when the matching ratio corresponds to a second designated range, the electronic device is configured to output an additional speech request message through at least one of the display device and the sound output device.

4. The electronic device of claim 3, wherein the additional speech request message comprises guide information regarding an additional speech.

5. The electronic device of claim 3, wherein the processor is configured to:
   when the matching ratio corresponds to a third designated ratio, search voice print information of another user regarding the acquired user identification information; and
   identify a user speaking the voice command on the basis of the acquired voice print information and the voice print information of another user.

6. The electronic device of claim 5, wherein, when the matching ratio corresponds to the third designated range, the processor is configured to output a message comprising at least one of a user authentication failure and information indicating the identified user.

7. The electronic device of claim 1, wherein, when a length of the received voice command is shorter than a designated length, the processor is configured to output an additional speech request message through at least one of a display device and a sound output device, and
   wherein the additional speech request message comprises guide information regarding an additional speech.

8. The electronic device of claim 1, further comprising at least one of a display device and a sound output device,
   wherein the processor is configured to:
   determine whether there exists the user identification information in the received voice command;
   when there does not exist the user identification information in the received voice command, output an additional speech request message regarding a voice command comprising the user identification information through at least one of the display device and the sound output device; and
   in response to the additional speech request message regarding the voice command, receive a voice command comprising the user identification information through the input device.

9. The electronic device of claim 1, wherein the processor is configured to determine whether the voice command received from the input device requires authentication, on the basis of whether the received voice command corresponds to at least one of a voice command requesting execution of a new service, a voice command comprising a pre-designated text, a voice command related to a service requiring security, a voice command requiring connection with an account of a specific user, or a voice command comprising an identification word.

10. The electronic device of claim 1, wherein the processor is configured to:
    detect a user authentication information registration event;
    acquire user account information;
    acquire user identification information and reference voice print information from a voice command for the user authentication information registration; and
    store the user identification information and the reference voice print information acquired from the voice command for the user authentication information registration in the memory as authentication information regarding the user account information.

11. The electronic device of claim 10, wherein the processor is configured to detect the user authentication information registration event on the basis of at least one of detection of an unregistered identification word, detection of an unregistered user, detection of a voice command to request registration, a request from an external electronic device, a user input through the input device, and a user input through a display device.

12. An operating method of an electronic device, the method comprising:
    receiving a voice command of a first user through an input device;

acquiring an identifier indicating the first user and voice print information of the first user from the received voice command;

searching a first reference voice print information including the identifier of the first user from among a plurality of pieces of reference voice print information stored in a memory, wherein the plurality of pieces of reference voice information include identifiers of a plurality of users including the first user, and are generated by the first user; a plurality of users; and performing authentication on the basis of a comparison between the acquired voice print information and the first reference voice print information;

based on the authentication failing, retrieving second reference voice print information from among the plurality of pieces of reference voice print information, wherein the second reference voice print information includes another identifier indicating a second user and is generated by the first user; and performing authentication of the first user based on a comparison between the acquired voice print information and the second reference voice print information, wherein the second reference voice print information is acquired from a previous voice command of the first user received in a state of successful authentication and stored in the memory.

13. The method of claim 12, wherein performing the first authentication or a second authentication comprises:

determining a matching ratio by comparing the acquired voice print information with the first reference voice print information or the second reference voice print information;

when the matching ratio correspond to a first designated range, determining that authentication succeeds, and refining the reference voice print information about each of the plurality of users on the basis of the voice print information acquired from the received voice command; and when the matching ratio corresponds to a second designated range, outputting an additional speech request message through at least one of a display device and a sound output device, wherein the additional speech request message comprises guide information regarding an additional speech.

14. The method of claim 12, further comprising, when a length of the received voice command is shorter than a designated length, outputting an additional speech request message through at least one of a display device and a sound output device, and wherein the additional speech request message comprises guide information regarding an additional speech.

15. The method of claim 12, further comprising:

determining whether there exists the user identification information in the received voice command;

when there does not exist the user identification information in the received voice command, outputting an additional speech request message regarding a voice command comprising the user identification information through at least one of a display device and a sound output device; and in response to the additional speech request message regarding the voice command, receiving a voice command comprising the user identification information through the input device.

* * * * *